United States Patent
Glover et al.

(10) Patent No.: US 10,209,872 B2
(45) Date of Patent: Feb. 19, 2019

(54) INDICATING STATES OF NATIVE APPLICATIONS IN APPLICATION LAUNCHER

(71) Applicant: Samsung Electronics Co., Ltd., Suwon-si, Gyeonggi-do (KR)

(72) Inventors: Eric Glover, Palo Alto, CA (US); Brent Harrison, Kent, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 551 days.

(21) Appl. No.: 14/956,356

(22) Filed: Dec. 1, 2015

(65) Prior Publication Data

US 2017/0153800 A1    Jun. 1, 2017

(51) Int. Cl.
| | |
|---|---|
| *G06F 3/0481* | (2013.01) |
| *G06F 3/0484* | (2013.01) |
| *G06F 3/0482* | (2013.01) |
| *G06F 3/0488* | (2013.01) |
| *G06F 9/48* | (2006.01) |

(52) U.S. Cl.
CPC ........ *G06F 3/04847* (2013.01); *G06F 3/0482* (2013.01); *G06F 3/04817* (2013.01); *G06F 3/04883* (2013.01); *G06F 3/04886* (2013.01); *G06F 9/4843* (2013.01)

(58) Field of Classification Search
CPC .......... G06F 3/00; G06F 3/048; G06F 3/0481; G06F 3/0482; G06F 3/0484; G06F 3/0488; G06F 9/48
See application file for complete search history.

(56) References Cited

U.S. PATENT DOCUMENTS

| | | | |
|---|---|---|---|
| 8,842,080 B2* | 9/2014 | Freedman | G06F 1/1616 345/173 |
| 2007/0033517 A1* | 2/2007 | O'Shaughnessy | G06F 17/30884 715/205 |
| 2010/0222040 A1* | 9/2010 | Bosan | G06Q 30/02 455/414.1 |
| 2014/0058912 A1* | 2/2014 | Bajaj | G06Q 40/00 705/35 |
| 2014/0250106 A1* | 9/2014 | Shapira | G06F 17/30864 707/722 |

\* cited by examiner

*Primary Examiner* — Xiomara L Bautista
(74) *Attorney, Agent, or Firm* — Jefferson IP Law, LLP

(57) ABSTRACT

A mobile computing device that is configured to: display an icon for a native application via an application launcher, the icon comprises a first image, the application launcher being configured to launch the native application into a first state upon receiving a user selection of the first image; receive a data object that includes information regarding a second state of the native application, the information comprises: an access mechanism that provides access to the second state; and a second image that corresponds with the second state; display the second image in association with the icon, the second image being displayed in conjunction with the first image; launch the native application into the first state in response to the user selection corresponding with the first image; and launch the native application into the second state in response to the user selection corresponding with the second image.

32 Claims, 7 Drawing Sheets

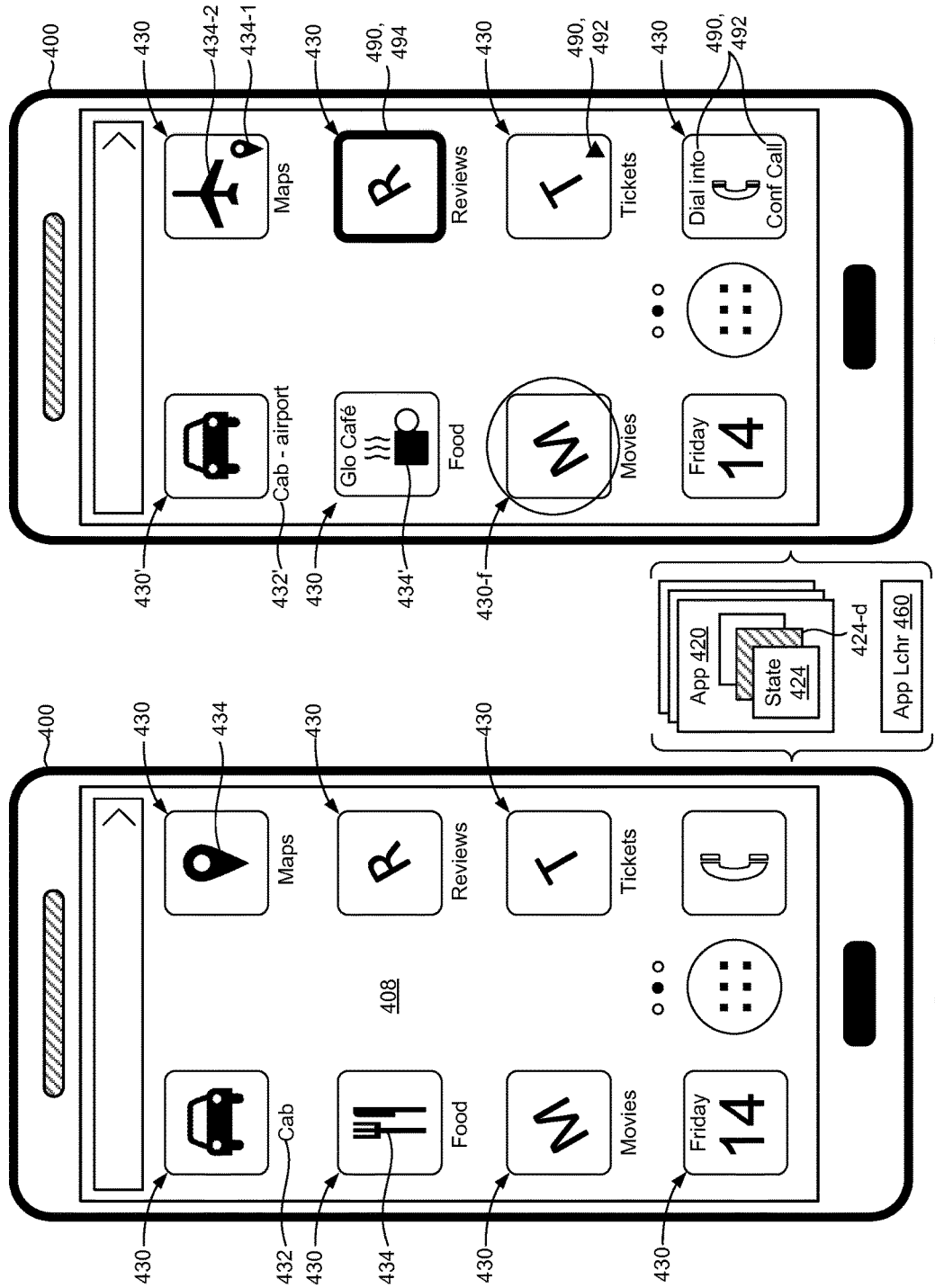

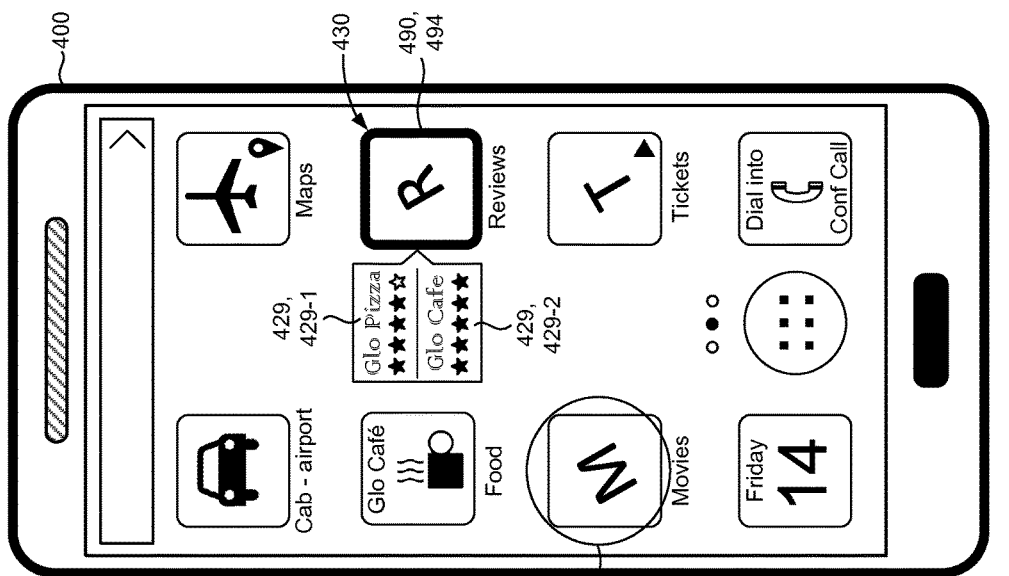
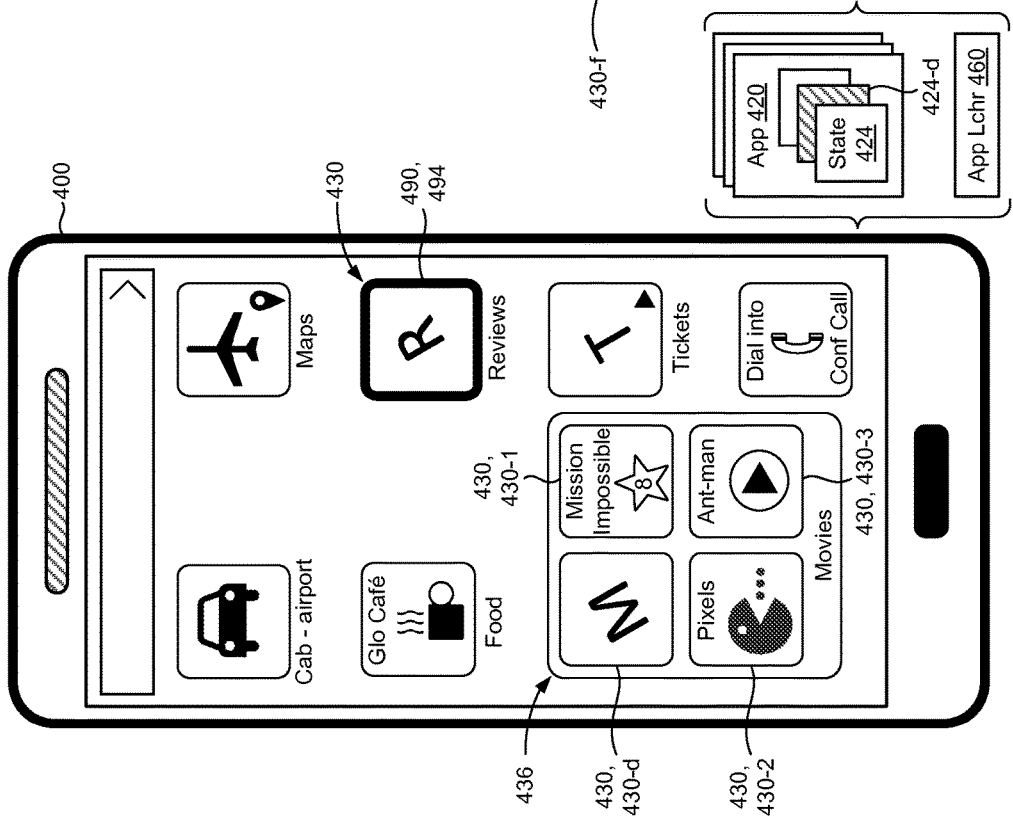

INDICATING STATES OF NATIVE APPLICATIONS IN APPLICATION LAUNCHER

TECHNICAL FIELD

This disclosure relates to indicating states of native applications in an application launcher.

BACKGROUND

Mobile computing devices can install and execute software applications. Software applications that are installed on a mobile computing device are often referred to as native applications. Most mobile computing devices include an application launcher that launches the native applications. In some mobile computing devices, the application launcher may be an integral part of an operating system that is installed on the mobile computing device. However, in many mobile computing devices, the application launcher may be a software application that can be downloaded similar to how the native applications are downloaded. The application launcher displays icons for the native applications on a home screen. Upon receiving a user selection of an icon, the application launcher launches the native application corresponding with the icon.

Most native applications have numerous states. Different states can display information about different entities. For example, a first state of a reviews application can display a review for a pizza store while a second state of the reviews application can display a review for a Chinese restaurant. Most native applications designate one of their states as a default state. The default state is presented when the native application is launched. Once the native application is launched, the user can select various graphical user interface (GUI) elements to navigate from the default state to another state. For example, the default state of the reviews application may include a search box. The user can enter the name of the pizza store in the search box and press a search button to view the state corresponding with the pizza store. Navigating from the default state to other states may require several user selections and may consume a non-trivial amount of time.

SUMMARY

One aspect of the disclosure provides a mobile computing device that can launch a native application into a state other than a default state of the native application. The mobile computing device includes a transceiver, a touchscreen display, sensors, a memory and a computing processor. The memory stores a native application installed on the mobile computing device and an application launcher that launches the native application. The computing processor executes computer-readable instructions that, when executed by the computing processor, cause the computing processor to display an icon corresponding with the native application via the application launcher. The icon includes a first image. The application launcher may be configured to launch the native application into a first state upon receiving a user selection of the first image.

The mobile computing device receives a data object that includes information regarding a second state of the native application. The information includes an access mechanism that provides access to the second state and a second image that corresponds with the second state. The computing processor displays the second image in association with the icon. The second image may be displayed in conjunction with the first image. The application launcher may be configured to launch the native application into the second state, via the access mechanism, upon receiving a user selection of the second image. The computing processor receives a user selection of the icon and determines whether the user selection of the icon corresponds with the first image or the second image. The computing processor launches the native application into the first state in response to the user selection corresponding with the first image. The computing processor launches the native application into the second state in response to the user selection corresponding with the second image.

Another aspect of the disclosure provides a mobile computing device that can launch a native application into a state other than a default state of the native application. The mobile computing device includes a transceiver, a touchscreen display, sensors, a memory and a computing processor. The memory stores a native application that includes an application identifier (ID) that identifies the native application. The memory stores an application launcher that launches the native application. The computing processor executes computer-readable instructions that, when executed by the computing processor, cause the computing processor to display an icon corresponding with the native application via the application launcher. The application launcher may be configured to launch the native application into a first state upon receiving a press of the icon.

The computing processor retrieves the application ID of the native application from the memory and transmits the application ID via the transceiver. In response to transmitting the application ID, the mobile computing device receives a data container that includes information regarding a second state of the native application. The information includes a preview of the second state and an access mechanism that provides access to the second state. The preview may include a text string that corresponds with the second state and/or an image that corresponds with the second state. The computing processor displays an indication in association with the icon. The indication indicates that the second state of the native application can be accessed by pressing and holding the icon. The mobile computing device displays the preview of the second state upon detecting a press-and-hold of the icon. The mobile computing device launches the native application into the second state via the access mechanism upon detecting a user selection (e.g., a press) of the preview.

Another aspect of the disclosure provides a mobile computing device that can launch a native application into a state other than a default state of the native application. The mobile computing device includes a transceiver, sensors, a memory and a touchscreen display. The memory stores a native application installed on the mobile computing device and an application launcher that launches the native application. The touchscreen display displays an icon corresponding with the native application via the application launcher. The application launcher may be configured to launch the native application into a first state upon receiving a user selection of the first image.

The mobile computing device includes means for determining a second state of the native application. The mobile computing device also includes means for indicating the second state in the application launcher. The mobile computing device includes a computing processor that executes computer-readable instructions that, when executed by the computing processor, cause the computing processor to receive a user input to launch the native application into the second state. The computing processor launches the native application into the second state upon receiving the user input to launch the native application into the second state.

Implementations of the disclosure may include one or more of the following features. In some implementations, the means for determining the second state include the computing processor executing computer-readable instructions that cause the computing processor to retrieve an application identifier (ID) that identifies the native application. The computing processor can retrieve the application ID from the memory and transmit the application ID via the transceiver. In response to transmitting the application ID, the computing processor receives a data object that includes information regarding the second state of the native application.

In some implementations, the means for determining the second state include the computing processor executing computer-readable instructions that cause the computing processor to capture contextual data that indicates a context of the mobile computing device. The computing processor sends the contextual data via the transceiver. In response to transmitting the contextual data, the computing processor receives a data container that includes information regarding the second state of the native application.

In some implementations, the means for determining the second state include the computing processor executing computer-readable instructions that cause the computing processor to capture contextual data that indicates a context of the mobile computing device. The computing processor compares the contextual data with rules associated with states of the native application and selects the second state of the native application based on the comparison.

In some implementations, the means for determining the second state include the computing processor executing computer-readable instructions that cause the computing processor to monitor current application usage. The computing processor compares the current application usage with historical application usage and selects the second state of the native application based on the comparison.

In some implementations, the icon includes a first caption and a first image. In such scenarios, the means for indicating the second state include the computing processor executing computer-readable instructions that cause the computing processor to determine a second caption and/or a second image that corresponds with the second state of the native application. The computing processor replaces the first caption with the second caption and/or replaces the first image with the second image. The computing processor links the icon to the second state by configuring the application launcher to launch the native application into the second state upon detecting a user selection of the icon.

In some implementations, the icon includes a first caption and a first image. In such scenarios, the means for indicating the second state include the computing processor executing computer-readable instructions that cause the computing processor to determine a second caption and/or a second image that corresponds with the second state of the native application. The computing processor modifies the icon by overlaying the second image or the second caption onto the first image. The computing processor links a portion of the icon to the second state by configuring the application launcher to launch the native application into the second state upon detecting a user selection of the second image or the second caption.

In some implementations, the icon includes a first image. In such scenarios, the means for indicating the second state include the computing processor executing computer-readable instructions that cause the computing processor to determine a second image that corresponds with the second state of the native application. The computing processor reduces a size of the first image and displays the second image in an area of the icon that was previously occupied by the first image. The computing processor links the second image to the second state by configuring the application launcher to launch the native application into the second state upon detecting a user selection of the second image.

In some implementations, the means for indicating the second state include the computing processor executing computer-readable instructions that cause the computing processor to retrieve a symbol from the memory. The computing processor overlays the symbol onto the icon. The computing processor configures the application launcher to display a preview of the second state upon detecting a press-and-hold of the icon.

In some implementations, the means for indicating the second state include the computing processor executing computer-readable instructions that cause the computing processor to replace the icon with a folder icon that corresponds with a folder. The computing processor places the icon for the first state and a second icon in the folder. The computing processor links the second icon to the second state by configuring the application launcher to launch the native application into the second state upon detecting a press of the second icon.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 is a diagram illustrating a conventional home screen of a mobile computing device.

FIG. 2A is a diagram illustrating an example mobile computing device that indicates particular states of native applications in the application launcher by modifying default state icons or replacing a default state icon with a folder icon.

FIG. 2B is a diagram of the mobile computing device illustrating the contents of a folder upon detecting a press of the folder icon in FIG. 2A.

FIG. 2C is a diagram of the mobile computing device illustrating previews of particular states upon detecting a long press of the default state icon for the reviews application.

Like reference symbols in the various drawings indicate like elements.

DETAILED DESCRIPTION

Figure 3:
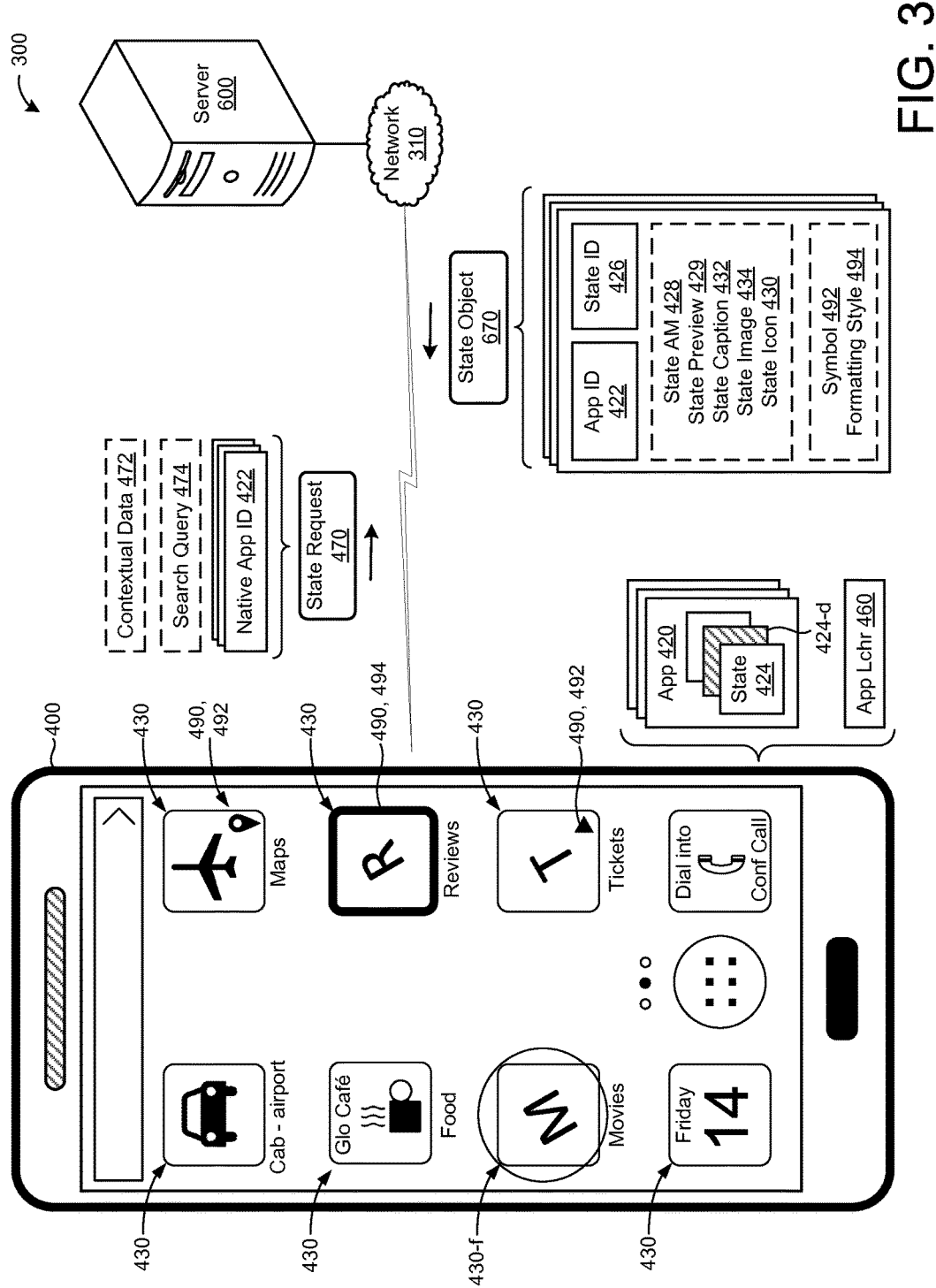
FIG. 3 is a schematic diagram of an example system that may be used to indicate alternative launch states of native applications in the application launcher.

Many mobile computing devices can install and execute software applications. Software applications that are installed on a mobile computing device may be referred to as native applications. Most mobile computing devices include an application launcher that launches the native applications. The application launcher may be integrated into an operating system of the mobile computing device. Alternatively, the application launcher may be a software application that can be downloaded and installed on the mobile computing device. The application launcher displays icons for the native applications on a home screen. Upon detecting a user selection of an icon, the application launcher launches the native application that corresponds with the selected icon.

Most conventional application launchers launch a native application into its default state. To navigate to a different state of the native application, the user of the mobile computing device may have to provide several user inputs after the native application is launched into its default state. For example, to view a price quote for a stock within a finance application, the user may have to enter a ticker symbol for the stock and then press a button. Such manual navigation from the default state to a non-default state of the native application may take a non-trivial amount of time. Non-default state refers to a state that is different from the default state.

The present disclosure provides a mobile computing device that can launch a native application into a particular state that is different from the default state. In other words, the mobile computing device can launch a native application directly into a non-default state. By launching a native application into a non-default state, the mobile computing device can eliminate the need for user inputs that may be needed to navigate from the default state to the non-default state. Moreover, by launching the native application into a particular non-default state, the mobile computing device can eliminate the latency that the user may experience while the native application transitions from the default state to the non-default state.

The mobile computing device includes an application launcher that can launch a native application into a particular state that is different from the default state. A state that is different from the default state may be referred to as a non-default state. The application launcher may be integrated into an operating system of the mobile computing device or the application launcher may a software program that can be downloaded and installed onto the mobile computing device. The application launcher displays icons for native applications on a home screen. In some implementations, the application launcher can launch the native application directly into a non-default state upon detecting a user selection (e.g., a press) of the icon. In such scenarios, the application launcher may modify an image of the icon and/or a caption of the icon to indicate that selecting the icon launches the native application into a state that is different from the default state.

In some implementations, the application launcher can modify the icon so that a first portion of the icon is linked to a first state (e.g., a default state) and a second portion of the icon is linked to a second state (e.g., a non-default state). Upon detecting a user selection of the first portion of the icon, the application launcher launches the native application into the first state (e.g., the default state). Similarly, upon detecting a user selection of the second portion of the icon, the application launcher launches the native application into the second state (e.g., the non-default state). The application launcher may indicate the first portion by displaying a first image or a first caption. Similarly, the application launcher may indicate the second portion by displaying a second image or a second caption.

In some implementations, the application launcher can display an indication in association with the icon to indicate that the native application can be launched into a state that is different from the default state. The indication may be a symbol that is overlaid onto the icon. Additionally or alternatively, the indication may be a formatting style that is applied to the icon. In such scenarios, the application launcher can launch the native application into a first state (e.g., default state) upon detecting a press of the icon. Moreover, the application launcher can launch the native application into a second state (e.g., non-default state) upon detecting a press-and-hold of the icon. In some scenarios, upon detecting a press-and-hold of the icon, the application launcher can display a preview of the second state. The preview may be user-selectable, so that a user can select the preview to launch the native application into the second state. The preview may include an image and/or a caption that corresponds with the second state. In some implementations, the preview may be an icon that corresponds with the second state. A press-and-hold may be referred to as a long press.

In some implementations, the application launcher can replace the icon for a native application with a folder icon that corresponds with a folder. The application launcher can place multiple icons in the folder, each icon in the folder can correspond with a different state of the native application. For example, a first icon (e.g., default state icon) can correspond with a first state (e.g., default state) and a second icon can correspond with a second state (e.g., a non-default state). Upon detecting a user selection of the folder icon, the application launcher displays the icons that are in the folder. Upon detecting a user selection of a particular icon, the application launcher launches the native application into a particular state that corresponds with the selected icon.

FIG. 1 illustrates a mobile computing device 400 that includes various native applications 420. The native applications 420 may refer to software applications that are installed on the mobile computing device 400. A native application 420 may include various states 424. One of the states 424 may be designated as a default state 424-*d* that is presented when the native application 420 is launched. The mobile computing device 400 also includes an application launcher 460 that launches the native applications 420. The application launcher 460 may be included in an operating system (not shown) of the mobile computing device 400. Alternatively, the application launcher 460 may be a software program that is provided by a third-party developer and can be installed by a user of the mobile computing device 400. In other words, the application launcher 460 may itself be a native application 420. Launching a native application 420 may refer to retrieving computer-readable instructions corresponding with the native application 420 from a memory (not shown) of the mobile computing device 400 and executing the computer-readable instructions at a computing processor (not shown).

The application launcher 460 can display a home screen 408. The home screen 408 displays various icons 430, each icon 430 corresponds with a native application 420. Most icons 430 include an icon caption 432 and an icon image

434. The mobile computing device 400 may receive a user selection of a particular icon 430 and launch the native application 420 corresponding with the selected icon 430. In the example of FIG. 1, the application launcher 460 can launch the native applications 420 into their default states 424-*d*. In other words, the icons 430 may be linked to the default states 424-*d* of their native applications 420. Upon launching a native application 420 into its default state 424-*d*, the mobile computing device 400 can accept further user selections in order to present other states 424 (e.g., non-default states 424) of the native application 420. For example, upon launching a native maps application 420 into its default state 424-*d*, the mobile computing device 400 can accept an address and present a state 424 that displays directions to the address. Similarly, upon launching a native cab application 420 into its default state 424-*d*, the mobile computing device 400 can accept a destination location (e.g., airport) and present a state 424 that requests a cab to the airport.

FIG. 2A illustrates an example implementation in which the mobile computing device 400 can launch the native applications 420 into states 424 that are different from their default states 424-*d*. Launch states 424 that are different from the default state 424-*d* may be referred to as alternative launch states 424 or non-default states 424. The mobile computing device 400 can employ numerous techniques to indicate that a native application 420 can be launched into an alternative launch state 424. In some implementations, the application launcher 460 indicates alternative launch states 424 by modifying the icon caption 432 shown in FIG. 1. For example, the application launcher 460 can display a modified icon caption 432'. In the example of FIG. 2A, the application launcher 460 changed the caption for the cab-requesting application from "Cab" to "Cab-airport". The modified icon caption 432' indicates that the cab-requesting application can be launched into a state 424 that automatically requests a cab to the airport. Upon detecting a user selection of the icon 430' for the cab-requesting application, the application launcher 460 can launch the cab-requesting application into the state 424 that requests a cab to the airport. In other words, the application launcher 460 can automatically parameterize a destination location field in the cab-requesting application with a location that corresponds with the airport.

In some implementations, the application launcher 460 can indicate an alternative launch state 424 by modifying the icon image 434 shown in FIG. 1. In the example of the food-ordering application, the application launcher 460 replaces the original icon image 434 for the food-ordering application shown in FIG. 1 with a replacement icon image 434'. The replacement icon image 434' corresponds with a particular state 424 of the food-ordering application that is associated with Glo Café' (a fictitious café).

In some implementations, the application launcher 460 can display a first image 434-1 in conjunction with a second image 434-2. The first image 434-1 can correspond with the default state 424-*d*, while the second image 434-2 may correspond with a non-default state 424. Upon detecting a user selection of the first image 434-1, the application launcher 460 can launch the native application 420 into the default state 424-*d*. Moreover, upon detecting a user selection of the second image 434-2, the application launcher 460 can launch the native application 420 into the corresponding non-default state 424. In the example of the maps application, the application launcher 460 can launch the maps application into its default state 424-*d* upon detecting a user selection of the first image 434-1. In its default state 424-*d*, the maps application can display a destination location field that accepts a destination location (e.g., airport). Upon receiving a destination location, the maps application displays a state 424 that shows directions to the destination location. As an alternative to launching the maps application into its default state 424-*d*, the application launcher 460 can launch the maps application directly into the state 424 that shows directions to the destination location upon detecting a user selection of the second image 434-2.

In some implementations, the application launcher 460 can indicate the availability of an alternative launch state 424 by displaying an indication 490 in association with the icon 430. The indication 490 may be a symbol 492 (e.g., a geometrical shape such as a triangle or a text string). Alternatively, the indication 490 may include a formatting style 494 that the application launcher 460 can apply to the icon 430. The formatting style 494 may include placing a thick border around the icon 430, increasing a size of the icon 430, slowing a refresh rate of the icon 430 to give the icon 430 a flashing appearance. The formatting style 494 may include any other suitable changes to the visual characteristics of the icon 430 that make the icon 430 appear different. An icon 430 that displays the indication 490 may be pressed to launch the native application 420 into the default state 424-*d*. Alternatively, the icon 430 may be pressed-and-held to display a preview of an alternative launch state 424. Upon detecting a user selection of the preview, the application launcher 460 can launch the native application 420 into the alternative launch state 424.

In some implementations, the application launcher 460 can indicate the availability of an alternative launch state 424 by replacing the default state icon 430 with a folder icon 430-*f*. The folder icon 430-*f* corresponds with a folder that the application launcher 460 can generate. The application launcher 460 can place the default state icon 430 in the folder. Additionally, the folder can store a second icon that is linked to the alternative launch state 424. Upon receiving a user selection of the folder icon 430-*f*, the application launcher 460 displays the icons 430 for the default state 424-*d* and the alternative launch state 424. The application launcher 460 can launch the native application 420 into the default state 424-*d* upon detecting a user selection of the icon 430 for the default state 424-*d*. Furthermore, the application launcher 460 can launch the native application 420 into the alternative launch state 424 upon detecting a user selection of the icon 430 for the alternative launch state 424.

FIG. 2B is a diagram of the mobile computing device 400 illustrating the contents of a folder upon detecting a press of the folder icon 430-*f* shown in FIGS. 2A and 2C. Upon detecting a user selection (e.g., press) of the folder icon 430-*f* shown in FIGS. 2A and 2C, the application launcher 460 displays a window 436 that displays the contents of the folder that corresponds with the folder icon 430-*f*. The window 436 displays various icons 430, each icon 430 corresponds with a different state 424 of the native movies application 420. For example, the default state icon 430-*d* corresponds with the default state 424-*d* of the movies application 420. Upon detecting a user selection (e.g., press) of the default state icon 430-*d*, the application launcher 460 launches the movies application 420 into the default state 424-*d*.

In the example of FIG. 2B, icons 430-1, 430-2 and 430-3 correspond with states 424 that are different from the default state 424-*d*. In other words, the icons 430-1, 430-2 and 430-3 correspond with non-default states 424 of the native movies application. For example, the second icon 430-1 corresponds with a state 424 that displays information about a movie called 'Mission Impossible'. Upon detecting a user selection of the second icon 430-1, the application launcher 460 launches the movies application 420 directly into the state 424 that displays information about the 'Mission Impossible' movie. The second icon 430-1 may display some information that is displayed by its corresponding state 424. In this example, the second icon 430-1 displays a rating for the 'Mission Impossible' movie. Similarly, the third icon 430-2 corresponds with a state 424 that displays information about a movie named 'Pixels'. Upon detecting a user selection of the third icon 430-2, the application launcher 460 can launch the movies application 420 directly into the state that displays information about the 'Pixels' movie. In this example, the third icon 430-2 displays an image (e.g., a movie poster) that corresponds with the 'Pixels' movie. Similarly, the fourth icon 430-3 corresponds with a state 424 that displays information about a movie named 'Ant-man'. Upon detecting a user selection of the fourth icon 430-3, the application launcher 460 can launch the movies application 420 directly into the state 424 corresponding with the 'Ant-man' movie. In this example, the fourth icon 430-3 displays a video playback button that may be selected to view a video (e.g., a trailer) for the 'Ant-man' movie.

FIG. 2C illustrates an example screen that the application launcher 460 displays upon detecting a press-and-hold (e.g., a long press) of the icon 430 for the reviews application 420. Upon detecting a press-and-hold of the icon 430, the application launcher 460 can display previews 429 for different states 424 of the review application 420. The previews 429 may be referred to as state previews 429. The previews 429 may display information typically displayed by the states 424. For example, a first preview 429-1 for Glo Pizza (a fictitious pizza store) includes a rating for Glo Pizza. Similarly, a second preview 429-2 for Glo Café (a fictitious café) includes a rating for Glo Café.

Upon detecting a user selection (e.g., a press) of any one of the previews 429, the application launcher 460 can launch the review application 420 into the state 424 corresponding with the selected preview 429. For example, upon detecting a press of the preview 429-1 for Glo Pizza, the application launcher 460 can launch the reviews application 420 into the state 424 corresponding with Glo Pizza. Similarly, upon detecting a press of the second preview 429-2 for Glo Café, the application launcher 460 can launch the reviews application 420 into the state 424 corresponding with Glo Café. The application launcher 460 may receive the previews 429 from a server.

FIG. 3 illustrates an example system 300 for determining, indicating and launching a native application 420 into a state 424 that is different from a default launch state 424-d of the native application 420. A launch state 424 that is different from the default launch state 424-d may be referred to as an alternative launch state 424 or a non-default state 424. The system 300 includes the mobile computing device 400 (e.g., client computing device) and a server 600. The mobile computing device 400 and the server 600 may communicate via a network 310. The network 310 may include a wireless network (e.g., a cellular network) and/or a wired network (e.g., Ethernet).

In operation, the mobile computing device 400 transmits a state request 470 to the server 600. The state request 470 includes application identifiers (IDs) 422 that identify the native applications 420 installed at the mobile computing device 400. In response to transmitting the state request 470, the mobile computing device 400 receives a state object 670 from the server 600. The state object 670 indicates alternative launch states 424 for the native applications 420. The state object 670 can indicate an alternative launch state 424 for a native application 420 by specifying a native application ID 422 that identifies the native application 420 and a state ID 426 that identifies the alternative launch state 424.

The state request 470 may include contextual data 472 in addition to the application IDs 422. The contextual data 472 indicates a context of the mobile computing device 400. The contextual data 472 may include sensor measurements taken by one or more sensors of the mobile computing device 400. Example sensor measurements include a location of the mobile computing device 400, an accelerometer reading, a magnetometer reading, a gyroscope reading, device temperature, ambient temperature, ambient lighting level, etc. The contextual data 472 may also indicate information that is currently being displayed by the mobile computing device 400 (e.g., onscreen information). The contextual data 472 may indicate which of the native applications 420 are currently being executed (e.g., active applications). In addition to the application IDs 422, the state request 470 may include a search query 474. The search query 474 may include one or more search terms.

The state object 670 may identify the alternative launch state 424 by including a state access mechanism 428 that provides access to the alternative launch state 424. The state access mechanism 428 may include a string that references the alternative launch state 424. For example, the state access mechanism 428 may reference the alternative launch state 424 by including an application resource identifier (ARI), a uniform resource identifier (URI) or a uniform resource locator (URL) that identifies the alternative launch state 424 and provides access thereto. The state access mechanism 428 may specify operations that can be performed by the mobile computing device 400. For example, the state access mechanism 428 may include a script (e.g., a macro) that redirects that native application 420 from the default launch state 424-d to the alternative launch state 424. The mobile computing device 400 can use the state access mechanism 428 included in the state object 670 to launch a native application 420 into the alternative launch state 424.

In some implementations, the state object 670 may include a preview 429 of the alternative launch state 424. The preview 429 may be referred to as a state preview 429. The preview 429 may include a portion of the information that is displayed by the alternative launch state 424. For example, as illustrated in FIG. 2C, the preview 429 may include a rating. The preview 429 can include any other suitable information from the alternative launch state 424. The application launcher 460 can display the preview 429 in response to a user selection (e.g., a press-and-hold) of an icon 430 that displays the indication 490. Moreover, the preview 429 may be linked to the state access mechanism 428. In such scenarios, the application launcher 460 can launch the native application 420 into the alternative launch state 424 via the state access mechanism 428 upon detecting a user selection (e.g., a press) of the preview 429.

In some implementations, the state object 670 may include an icon 430 for the alternative launch state 424. The application launcher 460 can replace the default state icon 430-d with the icon 430 included in the state object 670. The icon 430 may include an icon caption 432 and/or an icon image 434. The icon caption 432 may include a text string that corresponds with the alternative launch state 424. Furthermore, the icon image 434 may include an image that corresponds with the alternative launch state 424. For example, the icon image 434 may be a screenshot of the alternative launch state 424.

In some implementations, the state object 670 may include the caption 432 and/or the image 434. The application launcher 460 can modify the caption of a default state icon 430-*d* based on the caption 432 specified in the state object 670. For example, the application launcher 460 can replace the caption of the default state icon 430-*d* with the caption 432 specified in the state object 670. Similarly, the application launcher 460 can replace the image of the default state icon 430-*d* with the image 434 specified in the state object 670. Alternatively, the application launcher 460 may display the caption 432 and/or the image 434 in conjunction with the original caption and/or the original image of the default state icon 430-*d*.

The state object 670 may specify the indication 490. For example, the state object 670 may include the symbol 492 and/or the formatting style 494. The application launcher 460 can extract the symbol 492 from the state object 670 and overlay the symbol on an icon 430 to indicate the option to launch the corresponding native application 420 into an alternative launch state 424. Similarly, the application launcher 460 can extract the formatting style 494 from the state object 670 and apply the formatting style to an icon 430 to indicate the option to launch the corresponding native application 460 into an alternative launch state 424.

Figure 4:
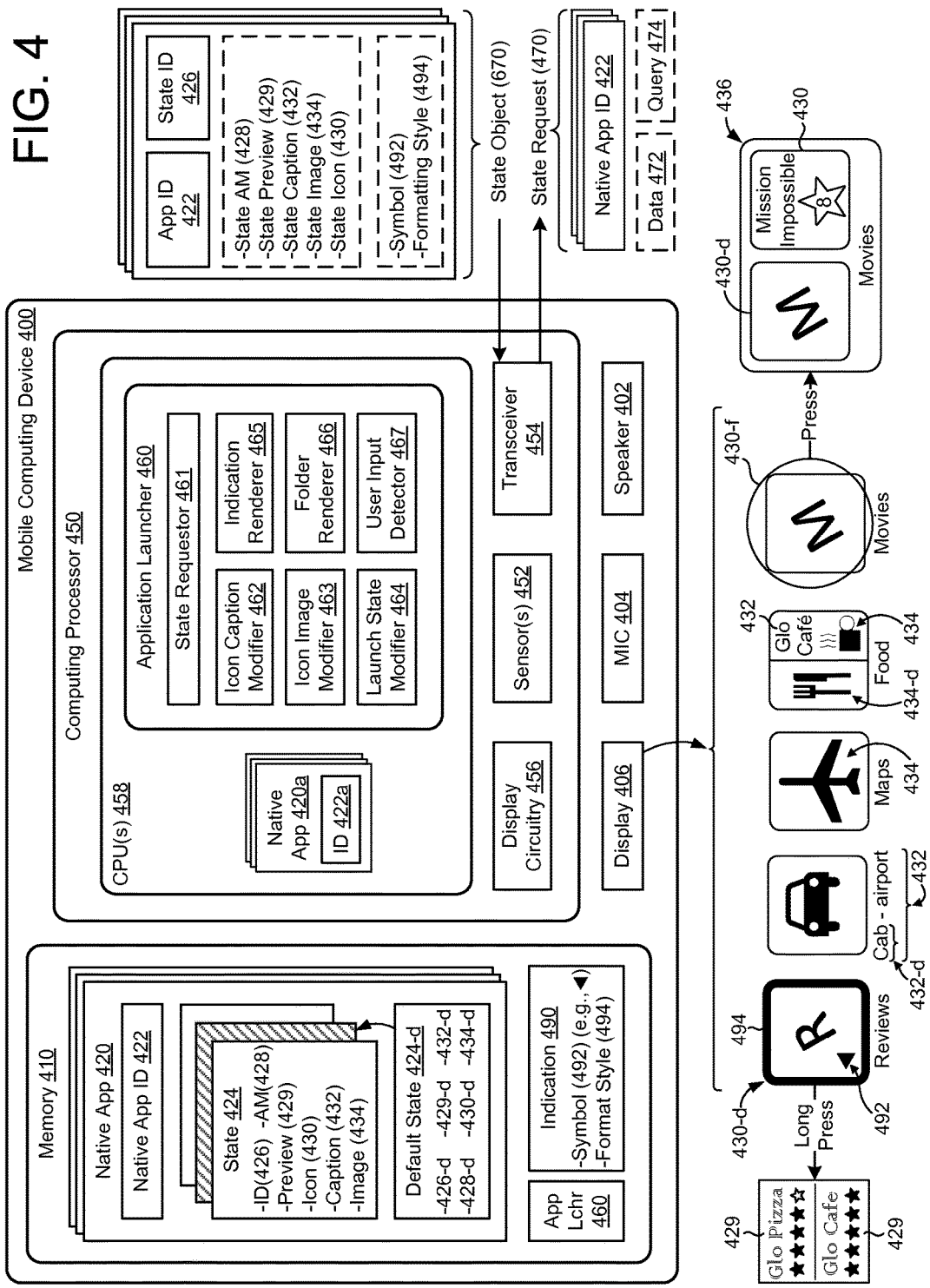
FIG. 4 is an example block diagram of the mobile computing device.

FIG. 4 is an example block diagram of the mobile computing 400. The mobile computing device 400 may include a speaker 402, a microphone 404, a touchscreen display 406, a memory 410 and a computing processor 450. The memory 410 may include one or more computer readable storage mediums. For example, the memory 410 may include solid state memory devices, hard disk memory devices, optical disk drives, read-only memory and/or nanotube-based storage devices. The memory 410 may be connected to the computing processor 450 via a bus (e.g., a data bus, an address bus, etc.) or one or more control lines.

The memory 410 can store native applications 420 that are installed on the mobile computing device 400. Each native application 420 may include a native application ID 422 (application ID 422, hereinafter) that identifies the native application 420. Each native application 420 may include various application states 424 (states 424, hereinafter). Each state 424 may correspond with a different entity and display information related to the entity. For example, a particular state, within a native review application, may correspond with a pizza store entity and may display crowd-sourced reviews of the pizza store.

A state 424 may be associated with a state ID 426 that identifies the state 424. A state 424 may be associated with a state access mechanism 428 that provides access to the state 424. A state 424 may be associated with a preview 429 that includes some of the information displayed by the state 424. A state 424 may be associated with an icon 430 that can be selected to launch the native application 420 into the state 424. The icon 430 can utilize the state access mechanism 428 to launch the native application 420 into the state 424. The icon 430 may include a caption 432 and/or an image 434. The caption 432 may refer to an entity that corresponds with the state 424. For example, if a state 424 displays information about Glo Pizza, the caption 432 may be "Glo Pizza" and the image 434 may be a picture of a pizza.

The native application 420 may identify one of the states 424 as a default launch state 424-*d* that is presented (e.g., displayed) when the native application 420 is launched. The state ID 426 for the default launch state 424-*d* may be referred to as the default state ID 426-*d*. The state access mechanism 428 for the default launch state 424-*d* may be referred to as the default state access mechanism 428-*d*. The preview 429 for the default launch state 424-*d* may be referred to as the default preview 429. The icon 430 for the default launch state 424-*d* may be referred to as the default state icon 430-*d*. The caption 432 for the default state icon 430-*d* may be referred to as the default caption 432-*d*. The image 434 for the default state icon 430-*d* may be referred to as the default image 434-*d*.

The memory 410 may store an application launcher 460. The application launcher 460 launches the native applications 420. The application launcher 460 itself may be a native application 420 that can be downloaded from a digital distribution platform (e.g., Google Play™). Alternatively, the application launcher 460 may be an operating system or a part thereof. The application launcher 460 can display the default state icons 430-*d* for the native applications 420. The default state icons 430-*d* can include the default captions 432-*d* and/or the default images 434-*d*. The application launcher 460 may display the default state icons 430-*d* on a home screen. Additionally or alternatively, the application launcher 460 may display the default state icons 430-*d* in an application tray and/or a folder. Upon receiving a user selection of a default state icon 430-*d*, the application launcher 460 can launch the native application 420 into its default launch state 424-*d*.

The memory 410 may store an indication 490 that the application launcher 460 can use to indicate that a native application 420 can be launched into an alternative launch state 424 (i.e., a state 424 that is different from the default launch state 424-*d*). The indication 490 may include a symbol 492 that the application launcher 460 can overlay onto a default state icon 430-*d*. The symbol 492 may include a geometric shape such as a circle, a square, a triangle or any other polygon. Additionally or alternatively, the symbol 492 may include a text string. The application launcher 460 may use the same symbol 492 for different native applications 420 or the application launcher 460 may use different symbols 492 for different native applications 420. For example, the memory 410 may store an inverted index that indexes the application IDs 422 to different symbols 492. The application launcher 460 can query the inverted index with an application ID 422 and retrieve the symbol 492 that corresponds with the application ID 422.

The indication 490 may include a formatting style 494 that the application launcher 460 can apply to a default state icon 430-*d* to make the default state icon 430-*d* appear different. The formatting style 494 may specify a value for a visual characteristic of the icons 430. For example, the formatting style 494 may specify a border thickness for the icons 430. The formatting style 494 may specify a font style, a font size, an icon size, an icon refresh rate or any other visual characteristic that can make the icon 430 appear different. Changing the icon refresh rate to a slower refresh rate can give the icon a flashing appearance (i.e., make it seems as if the icon is flashing). For example, the formatting style 494 may specify a three-dimensional effect that alters the look-and-feel of the icon 430. The application launcher 460 may use the same formatting style 494 for different native applications 420 or the application launcher 460 may use different formatting styles 494 for different native applications 420. For example, the memory 410 may store an inverted index that indexes the application IDs 422 to the different formatting styles 494. The application launcher 460 can query the inverted index with an application ID 422 and retrieve the formatting style 494 that corresponds with the application ID 422. The indication 490 may include an animation, or a series of individual images (e.g., an animated GIF (graphics interchange format)). As such, the icon 430 may include the animation, or the GIF.

The computing processor 450 may include one or more sensors 452, a transceiver 454, display circuitry 456 and one or more CPUs 458. Referring to the sensors 452, example sensors 452 include a location sensor that determines a location of the mobile computing device 400. The location sensor may use Global Positioning System (GPS) and/or Global Navigation Satellite System (GLONASS). The sensors 452 may include an accelerometer, a magnetometer, a gyroscope, a thermometer, a fingerprint reader, etc. The sensors 452 capture sensor measurements. The sensors 452 may capture the sensor measurements periodically and/or in response to a request. The computing processor 450 may store the sensor measurements captured by the sensors 452 in the memory 410. The computing processor 450 may retrieve the stored sensor measurements from the memory 410 and use the retrieved sensor measurements at a later time. For example, the computing processor 450 may include the sensor measurements in the state request 470.

The display circuitry 456 causes the touchscreen display 406 to display information. The display circuitry 456 may receive user input (e.g., user selections) from the touchscreen display 406. The display circuitry 456 may include a display driver. The display driver may drive the touchscreen display 406. For example, the display circuitry 456 may include a Light Emitting Diode (LED) driver that can drive a LED display. The display circuitry 456 may drive a stereoscopic display (e.g., an autostereoscopic 3D display).

The transceiver 454 enables electronic communication with other devices and network entities (e.g., the server 600 shown in FIG. 3). The transceiver 454 may include a cellular transceiver, for example, a LTE transceiver, a LTE-Advanced transceiver, or a 5G ($5^{th}$ generation mobile network) transceiver. The transceiver 454 may include a Wireless Fidelity (Wi-Fi) transceiver. The transceiver 454 may include a ZigBee transceiver, a Bluetooth transceiver (e.g., Bluetooth Low Energy transceiver), a Near Field Communications (NFC) transceiver, etc. The transceiver 454 may communicate via wired communications. For example, the transceiver 454 may communicate via an Ethernet cable, a USB cable, or the like.

The CPU(s) 458 are capable of executing computer-readable instructions that cause the CPU(s) 458 to execute the native applications 420 and the application launcher 460. The CPU(s) 458 may be based on the reduced instruction set computing (RISC) architecture (e.g., an ARM processor). Alternatively, the CPU(s) 458 may be based on the complex instruction set computing (CISC) architecture (e.g., an x86 processor). The CPU(s) 458 can be based on other architectural models (e.g., quantum computing). The CPU(s) 458 may include a single CPU or multiple CPUs (e.g., dual-core, quad-core or octa-core). The CPU(s) 458 may include general-purpose CPU(s) or special-purpose CPU(s), for example, Application Specific Integrated Circuit(s) (ASIC(s)), vector processors, etc. The CPU(s) 458 can execute the native applications 450 and the application launcher 460. Native applications 420 that are being executed by the CPU(s) 458 may be referred to as active native applications 420a and their application IDs 422 may be referred to as active application IDs 422a.

The application launcher 460 launches the native applications 420. The application launcher 460 launches a native application 420 in response to the mobile computing device 400 receiving a user selection to launch the native application 420 (e.g., upon detecting a press of a default state icon 430-d corresponding with the native application 420). To launch a native application 420, the application launcher 460 may instruct a kernel of the operating system to start a process for the native application 420. To start the process, the kernel may allocate memory for bookkeeping and then load (e.g., retrieve) the computer-readable instructions corresponding with the native application 420. The application launcher 460 may perform additional or alternative operations to launch a native application 420.

The application launcher 460 may include a state requestor 461 that generates the state request 470 and transmits the state request 470 via the transceiver 454. The state requestor 461 retrieves the native application IDs 422 from the memory 410. Additionally, the state requestor 461 may capture contextual data 472 (e.g., by retrieving the contextual data 472 from the memory 410). Examples of the contextual data 472 include sensor measurements taken by the sensors 452, the active application IDs 422a, a search history and information displayed by the touchscreen display 406 (e.g., onscreen information). Alternatively or additionally, the application launcher 460 may receive a search query 474 via a search box that enables a user of the mobile computing device 400 to enter the search query 474. The state requestor 461 can generate the state request 470 by instantiating a data container (e.g., a JSON file, XML file, etc.) that includes the native application IDs 422. The state request 470 may also include the contextual data 472 and/or the search query 474.

The application launcher 460 receives the state object 670 via the transceiver 454. The state object 670 includes information regarding one or more alternative launch state 424 for one or more native applications 420. Alternative launch states 424 refer to states 424 that are different from the default launch state 424-d. The application launcher 460 may receive the state object 670 in response to transmitting the state request 470. Alternatively, the application launcher 460 may receive the state object 670 without sending the state request 470 (e.g., the state object 670 can be pushed to the mobile computing device 400). As described herein, the application launcher 460 can use information included in the state object 670 to indicate the availability of alternative launch states 424. Moreover, the application launcher 460 can use information included in the state object 670 to launch a native application 420 into an alternative launch state 424.

The application launcher 460 may include an icon caption modifier 462 that modifies a default caption 432-d of a default state icon 430-d to indicate that the native application 420 can be launched into an alternative state 424. In some implementations, the icon caption modifier 462 can retrieve the caption 432 from the state object 670. Upon retrieving the caption 432, the icon caption modifier 462 can replace the default caption 432-d with the retrieved caption 432. Alternatively, the icon caption modifier 462 can append the caption 432 to the default caption 432-d. For example, the default caption 432-d for a cab-requesting application may be "Cab". In this example, the icon caption modifier 462 can replace "Cab" with "Cab-airport" to indicate that the cab-requesting application can be launched into a state that requests a cab to the airport.

The application launcher 460 may include an icon image modifier 463 that modifies a default image 434-d of a default state icon 430-d to indicate that the native application 420 can be launched into an alternative state 424. The icon image modifier 463 can retrieve the image 434 from the state object 670. In some implementations, the icon image modifier 463 replaces the default image 434-d with the retrieved image 434. In the example of FIG. 4, the icon image modifier 463 replaced the default image for the maps application with the image of an airplane image to indicate that the maps application can be launched into a state that displays directions to the airport. In some implementations, the icon image modifier 463 displays the retrieved image 434 in conjunction with the default image 434-d. In other words, the icon image modifier 463 can display the retrieved image 434 in addition to displaying the default image 434-d. In the example of FIG. 4, the icon 430 for the food-ordering application includes a cutlery image and a coffee mug image. If the application launcher 460 detects a user selection of the cutlery image, the application launcher 460 can launch the food-ordering application 420 into its default state 424-d. Otherwise, if the application launcher 460 detects a user selection of the coffee mug image, the application launcher 460 can launch the food-ordering application 420 into a non-default state 424 that relates to Glo Café.

The application launcher 460 may include a launch state modifier 464 that modifies a state access mechanism 428 associated with an icon 430. By default, a default icon 430-d may be associated with a default state 424-d. In other words, selecting a default icon 430-d may launch the corresponding native application 420 into its default state 424-d. The launch state modifier 464 can associate an icon 430 with the state access mechanism 428 for a non-default state 424, so that the application launcher 460 can launch the native application 420 into the non-default state 424 upon detecting a user selection of the icon 430. The launch state modifier 464 can retrieve the state access mechanism 428 for the non-default state 424 from the state object 670 and link the retrieved state access mechanism 428 with the icon 430.

The application launcher 460 may include an indication renderer 465 that renders the indication 490 to indicate that the native application 420 can be launched into an alternative launch state 424. The indication renderer 465 can retrieve the indication 490 from the memory 410. Alternatively, the indication renderer 465 can retrieve the indication 490 from the state object 492. Rendering the indication 490 may include retrieving the symbol 492 and overlaying the symbol 492 onto the icon 430. Alternatively, rendering the indication 490 may include retrieving the formatting style 494 and applying the formatting style 494 to the icon 430. In some scenarios, different native applications 420 may be associated with different indications 490. In such scenarios, the indication renderer 465 can retrieve the application ID 422 from the state object 670 and retrieve an indication 490 that corresponds with that particular application ID 422.

The application launcher 460 may include a folder renderer 466 that replaces the default icon 430-d for a native application 420 with a folder icon 430-f. In the example of FIG. 4, the folder renderer 466 replaced the default icon 430-d for the movies application with a folder icon 430-f. The folder renderer 466 places the default icon 430-d and icons 430 for non-default states 424 in a folder. When the application launcher 460 detects a user selection of the folder icon 430-f, the application launcher 460 can display a window 436 that includes the default icon 430-d and the non-default icon 430. Upon detecting a user selection of the default icon 430-d, the application launcher 460 can launch the native application 420 into its default state 424-d. Similarly, upon detecting a user selection of the non-default icon 430, the application launcher 460 can launch the native application 420 into the corresponding non-default state 424. In the example of FIG. 4, the folder renderer 466 replaced the default icon 430-d for the movies application with a folder icon 430-f. In this example, the folder renderer 466 displays the window 436 upon detecting a user selection of the folder icon 430-f. The window 436 displays the default icon 430-d for the movies application and a non-default icon 430. Selecting the default icon 430-d launches the movies application into its default state 424-d, whereas selecting the non-default icon 430-d launches the movies application into a state that displays information about the 'Mission Impossible' movie.

The application launcher 460 may include a user input detector 467 that can detect a user selection of an icon 430 and launch the corresponding native application 420 into a non-default state 424. The user input detector 467 may detect the user input to launch the native application 420 into the non-default state 424 in a variety of ways. In some implementations, a press of the icon 430 may be the user input that triggers launching the native application 420 into the non-default state 424. In some implementations, a press of a first portion of the icon 430 (e.g., a first image) launches the native application 420 into the default state 424-d and a press of a second portion of the icon 430 (e.g., a second image) launches the native application 420 into the non-default state 424. In some implementations, a press of the icon 430 launches the native application 420 into the default state 424-d and a long press (e.g., a press-and-hold operation) launches the native application 420 into the non-default state 424, or vice-versa. In some implementations, a press or a long press of the icon 430 displays state previews 429 and a press of one of the previews 429 launches the native application 420 into the state 424 that corresponds with the preview 429. In some implementations, a press of a folder icon 430-f displays a window 436 that includes an icon 430 and a press of the icon 430 launches the native application 420 into the state 424 that corresponds with the icon 430.

Figure 5:
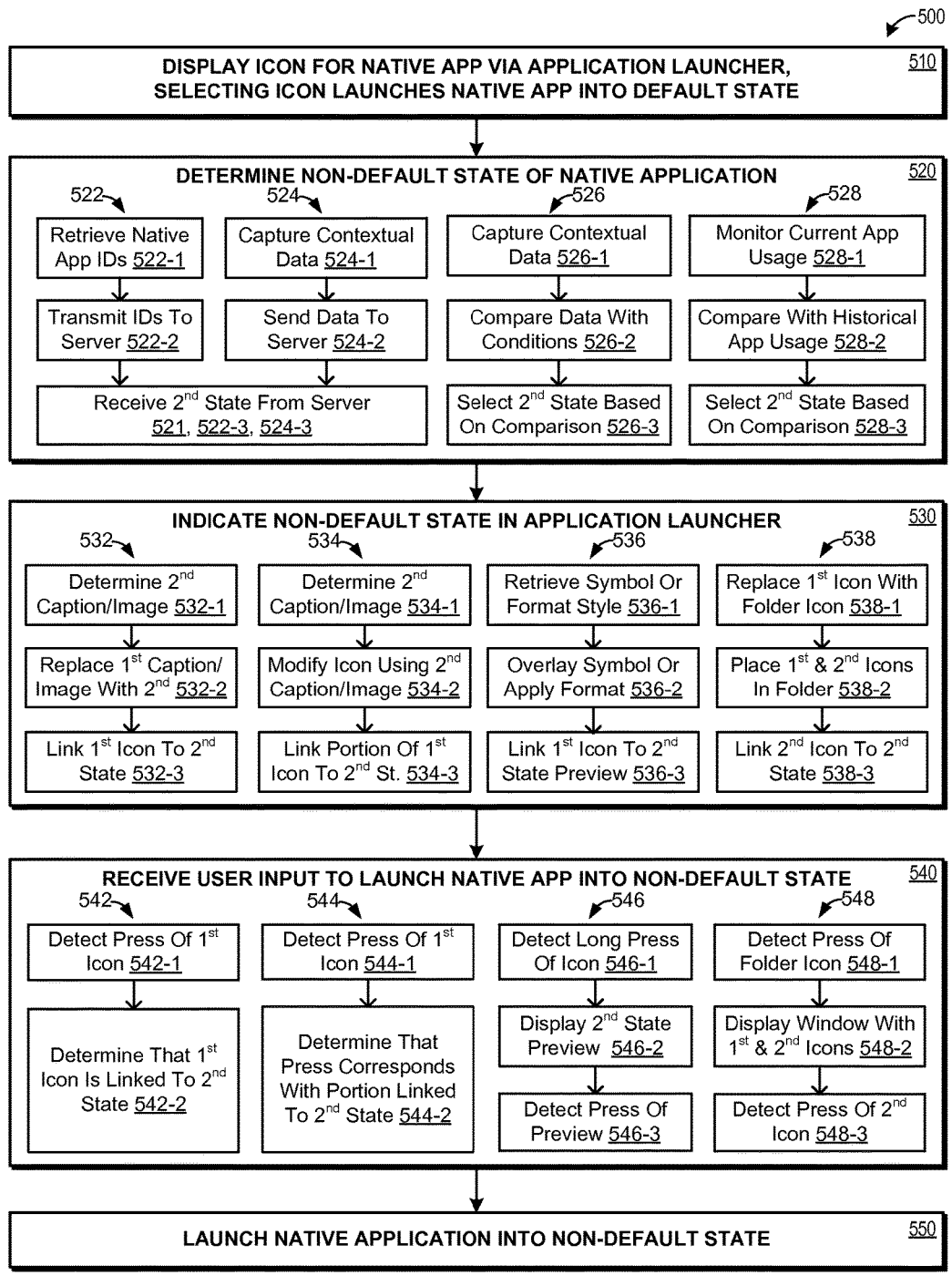
FIG. 5 is a block diagram of an example method that the mobile computing device may execute to determine alternative launch states for native applications and indicate the alternative launch states in the application launcher.

FIG. 5 illustrates an example method 500 for launch a native application into a state that is different from a default launch state of the native application. The method 500 may be executed by a mobile computing device (e.g., the mobile computing device 400 shown in FIG. 4). The method 500 may be implemented as a set of computer-readable instructions that are executed by a computing processor (e.g., the computing processor 450 shown in FIG. 4). Generally, the mobile computing device displays an icon that corresponds with a native application (at 510). By default, upon detecting a user selection of the icon, the mobile computing device can launch the native application into a default launch state of the native application. At 520, the mobile computing device determines a second state that is different from the default launch state. The second state may be referred to as a non-default state or an alternative launch state. At 530, the mobile computing device indicates that the native application can be launched into the non-default state instead of the usual default state. At 540, the mobile computing device receives a user input to launch the native application into the non-default state. Upon receiving the user input, the mobile computing device launches the native application into the non-default state (at 550).

Referring to 510, the mobile computing device can display icons that correspond with various native applications that are installed on the mobile computing device. An icon may include a caption and an image. The caption may include a text string. For example, the icon for a food-ordering application may include "food" as a caption. The image may be a picture that is related to the application. For example, the image for the food-ordering application may be a picture of a fork and a knife. The mobile computing device may include an application launcher that displays the icons. The application launcher may be an integral part of the mobile computing device. For example, the application launcher may be built into the operating system of the mobile computing device. Alternatively, the application launcher may be a native application that is installed on the mobile computing device. By default, the application launcher may launch a native application into its default state upon detecting a user selection of the corresponding icon. As described herein, the application launcher can be configured to launch the native application into a state that is different from the default state (i.e., a non-default state).

Referring to 520, the mobile computing device determines (e.g., identifies) a second state that is different from the default state. The second state may be referred to as the non-default state. The mobile computing device can launch the native application into the non-default state instead of the default state. The mobile computing device can utilize a variety of techniques to identify the non-default state. In some implementations, the mobile computing device can send information to a server. The server can utilize the information to determine the non-default state and indicate the non-default state to the mobile computing device. The operations indicated by 522 and 524 are examples of such implementations. Alternatively, the mobile computing device can determine the non-default state on its own (i.e., without sending information to the server). The operations indicated by 526 and 528 are examples of implementations in which the mobile computing device determines the non-default state without interacting with the server.

In some implementations, the mobile computing device can receive an indication of a second state (e.g., a non-default state) from a server (at 521). The mobile computing device may receive an application ID that identifies the native application and a state ID that identifies the second state. The mobile computing device may receive a state access mechanism that the mobile computing device can utilize to access the second state. The state access mechanism may be a string that identifies the second state and provides access to the second state. For example, the state access mechanism may include an application resource identifier (ARI), a uniform resource identifier (URI) or a uniform resource locator (URL) for the second state. The mobile computing device may receive information regarding the second state from the server without sending any request to the server. In other words, the second state may be pushed to the mobile computing device via a push message.

Referring to 522, the mobile computing device may receive information regarding the second state upon sending information regarding the native applications installed on the mobile computing device. The mobile computing device may retrieve application IDs for the native applications that are installed on the mobile computing device (at 522-1). The mobile computing device can retrieve the application IDs from the memory. Upon retrieving the application IDs, the mobile computing device can transmit the application IDs to the server (at 522-2). The mobile computing device can instantiate a data container (e.g., JSON object, XML file, etc.) that represents a state request and write the application IDs to the data container. In response to transmitting the state request to the server, the mobile computing device can receive information regarding the second state from the server (at 522-3).

Referring to 524, the mobile computing device may receive information regarding the second state upon sending information regarding a context of the mobile computing device. The mobile computing device can capture contextual data (at 524-1). Capturing contextual data may include recording sensor measurements such as location, time of day, etc. Capturing contextual data can include identifying the native applications that are currently executing at the mobile computing device (i.e., the active native applications). Capturing contextual data may include capturing the information that is currently being displayed by the mobile computing device (i.e., onscreen information). Upon capturing the contextual data, the mobile computing device can transmit the contextual data to the server (at 524-2). Transmitting the contextual data may include instantiating a data container, writing the contextual data to the data container and transmitting the data container to the server. In response to transmitting the contextual data, the mobile computing device can receive information regarding the second state from the server (at 524-3).

Referring to 526, the mobile computing device may determine the second state based on its current context. The mobile computing device can capture contextual data (at 526-1). The mobile computing device can compare the contextual data with specific conditions (at 526-2). Each condition may be associated with a particular state. The mobile computing device can select the second state based on the comparison (at 526-3). Specifically, the mobile computing device can select a state associated with a condition as the second state, if the contextual data satisfies the condition. Referring to the example of the food-ordering application, a condition associated with the Glo Café state may be a time duration of 11 am to 1 pm. If the current time is between 11 am and 1 pm, then this condition is satisfied and the mobile computing device can select the Glo Café state as the second state.

Referring to 528, the mobile computing device may determine the second state based on current application usage. The mobile computing device can monitor the current application usage (at 528-1). Monitoring the current application usage may include recording a sequence in which the native applications are utilized (e.g., activated or executed). Monitoring the current application usage may include recording a sequence in which particular states of a native application are displayed. Monitoring the current application usage may also include recording times at which particular stated of native applications are displayed. The mobile computing device can compare the current application usage with historical application usage (at 528-2) and select the second state based on the comparison (at 528-3). For example, historical application usage may indicate that after checking a restaurant review on the reviews application, the user uses the cab-requesting application to request a cab to the restaurant. In this example, if the current application usage indicates that the reviews application displayed a restaurant review within a predefined amount of time, then the mobile computing device can determine that the user may want to request a cab to the restaurant. Consequently, the mobile computing device can display an indication in association with the icon for the cab-requesting application to indicate that the cab-requesting application can be launched into a state that automatically requests a cab to the restaurant recently viewed through reviews application.

At 530, the mobile computing device indicates that a native application can be launched into a non-default state. The mobile computing device can employ various visual techniques to indicate that a native application can be launched into a non-default state. For example, the mobile computing device can replace the caption and/or the image of the icon (at 532). Alternatively, the mobile computing device can modify the caption and/or the image of the icon (at 534). In some implementations, the mobile computing device can overlay a symbol onto the icon or apply a formatting style to the icon (at 536). In some implementations, the mobile computing device can replace the icon with a folder icon (at 538).

Referring to 532, the mobile computing device can replace the caption and/or the image of an icon to indicate that the corresponding native application can be launched into a non-default state. In other words, the mobile computing device can replace a first caption and/or a first image with a second caption and/or a second image. At 532-1, the mobile computing device determines the second caption and/or the second image. In some implementations, the mobile computing device receives the second caption and/or the second image from a server. Alternatively, if the mobile computing device determined the second state on its own, then the mobile computing device may determine the second caption by capturing a title of the second state. Similarly, the mobile computing device may determine the second image by retrieving an image from the second state. At 532-2, the mobile computing device replaces the first caption with the second caption. Alternatively or additionally, the mobile computing device can replace the first image with the second image. At 532-3, the mobile computing device can link the icon with the second state, so that the native application launches into the second state when the icon is selected. Specifically, the mobile computing device may replace a first access mechanism for the first state with a second access mechanism for the second state. The mobile computing device may receive the second access mechanism from the server.

Referring to 534, the mobile computing device may modify the caption and/or the image of an icon to indicate that the corresponding native application can be launched into a non-default state. In other words, the mobile computing device can modify a first caption and/or a first image based on a second caption and/or a second image. At 534-1, the mobile computing device determines the second caption and/or the second image. The mobile computing device may determine the second caption and/or the second image based on techniques described in relation to operation 532-1. At 534-2, the mobile computing device modifies the first caption and/or the first image based on the second caption and/or the second image. In some implementations, the mobile computing device can append the second caption to the first caption. For example, referring to the caption of the cab-requesting application shown in FIG. 2A, the mobile computing device appended "airport" to "Cab". In some implementations, the mobile computing device can overlay the second caption onto the first image. For example, referring to the icon for the food-ordering application shown in FIG. 2A, the mobile computing device overlaid "Glo Café" onto the image. In some implementations, the mobile computing device can display the second image in conjunction with the first image (e.g., see icon for maps application in FIG. 2A).

At 534-3, the mobile computing device can link a portion of the icon to the second state of the native application, so that selecting that portion launches the native application into the second state. If the mobile computing device appended the second caption to the first caption, then selecting the modified caption may launch the native application into the second state, while selecting the image may launch the native application into the first state. For example, referring to the icon for the cab-requesting application shown in FIG. 2A, selecting the "Cab-airport" caption can launch the cab-requesting application into a state that automatically requests a cab to the airport. In this example, selecting the car image can launch the cab-requesting application into its default state where the user can enter a destination address. If the mobile computing device displayed the second image in conjunction with the first image, then selecting the second image can launch the native application into the second state. Likewise, selecting the first image can launch the native application into the first state. For example, referring to the icon for the maps application shown in FIG. 2A, selecting the airplane image can launch the maps application into a state that displays directions to the airport. Likewise selecting the balloon image can launch the maps application into its default state where the user can enter a destination address.

Referring to 536, the mobile computing device can indicate that a native application can be launched into a non-default state by overlaying a symbol onto the corresponding icon or by applying a formatting style to the icon. At 536-1, the mobile computing device retrieves a symbol or a formatting style. The mobile computing device may retrieve the symbol or the formatting style from the memory. Alternatively, the mobile computing device may receive the symbol or the formatting style from the server. At 536-2, the mobile computing device overlays the symbol on the icon or applies the formatting style to the icon. Overlaying the symbol may include displaying a geometric figure (e.g., a small triangle, square, circle, etc.) on top of the image. Applying the formatting style may include modifying a visual characteristic of the icon. For example, applying the formatting style may include thickening a border of the icon, altering a refresh rate of the icon to give the icon a flashing appearance, etc. Lastly, the mobile computing device links the icon to the second state (at 536-3). The mobile computing device can configure the icon to display a preview of the first state and the second state when the icon is selected. The preview can display at least some of the information that is displayed by the individual states.

Referring to 538, the mobile computing device can indicate that a native application can be launched into a non-default state by replacing the default icon for the native application with a folder icon (at 538-1). The folder icon corresponds with a folder. In other words, upon detecting a user selection of the folder icon, the mobile computing device can display a window that shows the contents of the folder. At 538-2, the mobile computing device stores the default icon and a non-default icon in the folder. The default icon corresponds with the default state (e.g., the first state) of the native application and the non-default icon corresponds with a non-default state (e.g., the second state determined at 520). At 538-3, the mobile computing device links the default icon with the state access mechanism for the default state and the non-default icon with the state access mechanism for the non-default state. Consequently, the mobile computing device can launch the native application into the default state upon detecting a user selection of the default icon. Likewise, the mobile computing device can launch the native application into the non-default state upon detecting a user selection of the non-default icon.

At 540, the mobile computing device receives a user input to launch the native application into a non-default state. In other words, the mobile computing device detects a user selection to launch the native application into a state that is different from the default state of the native application. The mobile computing device can receive the user input to launch the native application into the default state in a variety of different ways. For example, if the mobile computing device linked the icon for native application to the non-default state, then the user input to launch the native application into the non-default state may be a user selection of the icon (at 542). If the mobile computing device linked a first portion of the icon to the default state and a second portion of the icon to the non-default state, then the user input to launch the native application into the non-default state may be a user selection of the second portion (at 544). In some implementations, the user input to launch the native application into the non-default state may include detecting a long press of the icon and then detecting a user selection of a preview that is displayed in response to the long press (at 546). In some implementations, the user input to launch the native application into the non-default state may include detecting a user selection of a folder icon, displaying an icon for the non-default state in a folder window and then detecting a user selection of the icon (at 548).

Referring to 542, the mobile computing device detects a user selection of an icon for a native application (at 542-1). At 542-2, the mobile computing device determines whether the selected icon is linked to a non-default state of the native application. If the selected icon is linked to a non-default state of the native application, then the mobile computing device determines that the mobile computing device has received a user input to launch the native application into the non-default state.

Referring to 544, the mobile computing device detects a user selection of an icon (at 544-1). The icon may include a first portion and a second portion. The first portion may be linked to a first state (e.g., the default state) of the native application. Likewise, the second portion may be linked to a second state (e.g., a non-default state) of the native application. At 544-2, the mobile computing device determines whether the user selection corresponds with the first portion or the second portion. If the user selection corresponds with the second portion, then the mobile computing device determines that the mobile computing device has received a user input to launch the native application into the non-default state. In some examples, the first portion may be a first image and the second portion may be a second image. In such examples, the mobile computing device can determine that the mobile computing device has received a user input to launch the native application into the non-default state upon detecting a user selection of the second image.

Referring to 546, in some implementations, a press corresponds with a default state of the native application, whereas a long press corresponds with a non-default state of the native application. The mobile computing device may detect a long press of an icon (at 546-1). A long press may refer to a press that is longer than a threshold amount of time (e.g., 0.5 seconds). Upon detecting the long press, the mobile computing device can display previews of non-default states (at 546-2). A preview of a non-default state may include information that is displayed by the non-default state. For example, a preview of a state that displays a review of a restaurant may include a name of the restaurant and a rating of the restaurant. The preview may be a user-selectable link. At 546-3, the mobile computing device can detect a user selection of the preview and launch the native application into the non-default state that corresponds with the preview.

Referring to 548, in some implementations, the mobile computing device may have replaced an icon for a native application with a folder icon. In such implementations, the mobile computing device may detect a user selection of the folder icon (at 548-1). Upon detecting the user selection of the folder icon, the mobile computing device can display a window that displays the contents of the folder (at 548-2). The window can display a first icon that corresponds with the default state of the native application and a second icon that corresponds with a non-default state of the native application. At 548-3, the mobile computing device determines that the mobile computing device has received a user input to launch the native application into the non-default state upon detecting a user selection of the second icon.

At 550, the mobile computing device launches the native application into the non-default state. In other words, the mobile computing device launches the native application into a state that is different from the default state of the native application. The mobile computing device may utilize a state access mechanism for the non-default state to launch the native application into the non-default state. The state access mechanism may include a string that identifies the non-default state and provides access to the non-default state. For example, the state access mechanism may include an ARI, a URI or a URL that identifies the non-default state.

Figure 6:
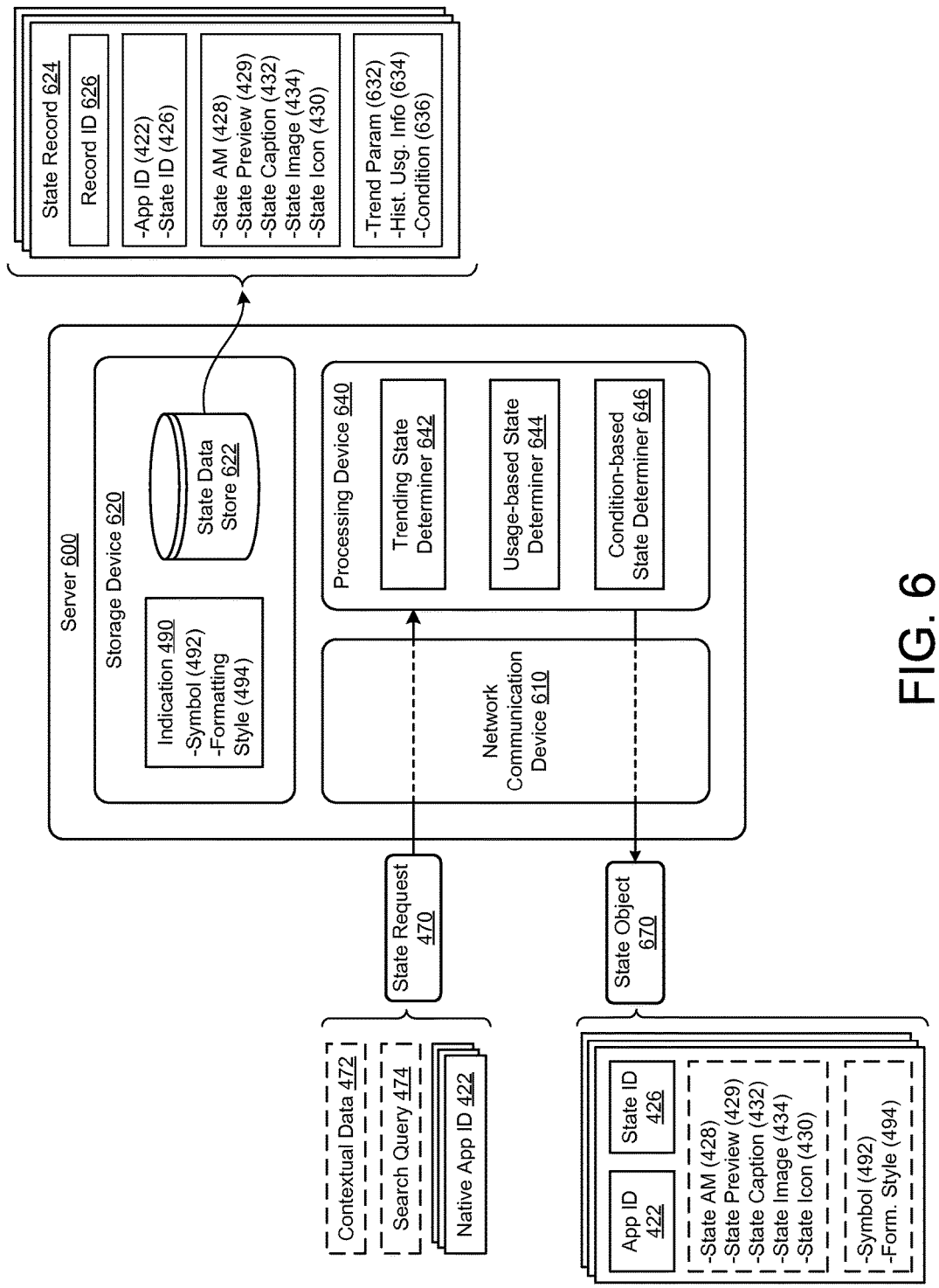
FIG. 6 is a block diagram of an example server that determines alternative launch states for native applications that are installed at the mobile computing device.

FIG. 6 is an example block diagram of the server 600. The server 600 may include a network communication device 610, a storage device 620 and a processing device 640. The server 600 may be implemented by a cloud computing platform. The cloud computing platform may include a collection of remote computing services. The cloud computing platform may include computing resources (e.g., the processing device 640). The computing resources may include physical servers that have physical central processing units (pCPUs). The cloud computing resources may include storage resources (e.g., the storage device 620). The storage resources may include database servers that support NoSQL, MySQL, Oracle, SQL Server, or the like. The cloud computing platform may include networking resources (e.g., the network communication device 610). Example cloud computing platforms include Amazon Web Services®, Google Cloud Platform®, Microsoft AZURE™ and Alibaba Aliyun™.

The network communication device 610 communicates with a network (e.g., the network 310 shown in FIG. 3). The network communication device 610 may include a communication interface that performs wired communication (e.g., via Ethernet, Universal Serial Bus (USB) or fiber-optic cables). The network communication device 610 may perform wireless communication (e.g., via Wi-Fi, Bluetooth, Bluetooth Low Energy (BLE), Near Field Communications (NFC), ZigBee, a cellular network, or satellites). The network communication device 610 may include a transceiver. The transceiver may operate in accordance with an Institute of Electrical and Electronics Engineers (IEEE) specification (e.g., IEEE 802.3 or IEEE 802.11). The transceiver may operate in accordance with a 3rd Generation Partnership Project (3GPP) specification (e.g., Code Division Multiple Access (CDMA), Long Term Evolution (LTE) or LTE-Advanced). The transceiver may operate in accordance with a Universal Serial Bus (USB) specification (e.g., via a USB port).

The storage device 620 stores data. The storage device 620 may include one or more computer readable storage mediums. For example, the storage device 620 may include solid state memory devices, hard disk memory devices, optical disk drives, read-only memory and/or nanotube-based storage devices. The storage device 620 may be connected to the processing device 640 via a bus and/or a network. Different storage mediums within the storage device 620 may be located at the same physical location (e.g., in the same data center, same rack, or same housing). Different storage mediums of the storage device 620 may be distributed (e.g., in different data centers, different racks, or different housings). The storage device 620 may implement (e.g., store) a state data store 622. In some implementations, the storage device 620 may store the indication 490 described in relation to FIG. 4.

The state data store 622 stores various state records 624. Each state record 624 corresponds with a state of a native application. A state record 624 may include a record ID 626 that identifies the state record 624. A state record 624 may include an application ID 422 and a state ID 426 that together identify a particular state of a native application. A state record 624 may store a state access mechanism 428 that can be used to access the corresponding state. A state record 624 may store a preview 429 of the state. The preview 429 may include a portion of the information that is displayed by the state. A state record 624 may include a caption 432 (e.g., a name or a title) for the state. A state record 624 may include an image 434 (e.g., a logo or a screenshot) for the state. A state record 624 may include an icon 430 for the state. The icon 430 may include the caption 432 and the image 434. The icon 430 may be linked with the state access mechanism 428, so that selecting the icon 430 on a mobile computing device causes the mobile computing device to launch the native application into the state associated with the state access mechanism 428.

A state record 624 may store a trend parameter 632. The trend parameter 632 may indicate whether the state is currently trending. A state may be currently trending, if the state is currently among the most popular states in the native application. A state may be among the most popular states of the native application, if the state has been viewed more often than most other states of the native application. The trend parameter 632 may include a value that indicates the popularity of the state. The value may range from 0 to 1.0. A higher value may indicate higher popularity. For example, a state with a trend parameter 632 of 0.9 may be more popular than a state with a trend parameter of 0.2.

A state record 624 may include historical usage information 634. The historical usage information 634 may indicate the context of mobile computing devices when the mobile computing devices accessed the state. For example, the historical usage information 634 may include various contextual parameters such as time of day, a previous application or a previous state that the mobile computing device displayed, etc. In some implementations, the historical usage information 634 may include contextual parameters from various mobile computing devices. In such implementations, the server 600 can select the state as a non-default state, if the current context of a mobile computing device matches the context of other mobile computing devices when the other mobile computing devices accessed the state. In some implementations, the server 600 can select the state as a non-default state, if a current context of a mobile computing device matches a previous context of the same mobile computing device when the mobile computing device previously accessed the state.

A state 624 may store one of more conditions 636. A condition 636 may specify contextual parameters that must be satisfied in order for the state to be selected as a non-default state. For example, a condition 636 may specify a time of day, a location, a previous application or a previous state that the mobile computing device displayed, etc. The conditions 636 may be referred to as rules. The server 600 can select a state as a non-default state, if the condition 636 associated with the state is satisfied.

The processing device 640 may include a collection of one or more computing processors that execute computer readable instructions. The computing processors of the processing device 640 may operate independently or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The processing device 640 may execute computer-readable instructions corresponding with a trending state determiner 642, a usage-based state determiner 644 and a condition-based state determiner 646.

The trending state determiner 642 determines a state that is currently trending. A state may be currently trending, if the state is among the most popular states of the native application. The trending state determiner 642 can identify a trending state based on the trending parameters 632 associated with the states. For example, the trending state determiner 642 can select a state with the highest trending parameter 632. In operation, the trending state determiner 642 receives the state request 470. The state request 470 includes the native application IDs 422. For each native application ID 422 in the state request 470, the trending state determiner 642 can identify a state that is currently trending. Specifically, the trending state determiner 642 may identify all the state records 624 that correspond with a particular native application ID specified in the state request 470. Upon identifying the state records 624, the trending state determiner 642 can select the state record 624 with the highest value for the trending parameter 632.

The usage-based state determiner 644 determines a state based on the historical usage information 634. The usage-based state determiner 644 can select a state record 624 based on a comparison of the historical usage information 634 and the contextual data 472. Specifically, the usage-based state determiner 644 can select a state record 624, if the historical usage information 634 in the state record 624 matches the contextual data 472 in the state request 470. For example, the historical usage information 634 may indicate that many mobile computing devices displayed a second state soon after displaying a first state. In this example, if the contextual data 472 indicates that a mobile computing device displayed the first state, then the usage-based state determiner 644 can select the state record 624 for the second state.

The condition-based state determiner 646 selects a state record 624 based on the conditions 636. Specifically, the condition-based state determine 646 can select a state record 624, if the condition 636 associated with the state record 624 is satisfied. The condition-based state determiner 646 may utilize the contextual data 472 and/or the search query 474 in the state request 470 to determine whether a condition 636 has been met. For example, a condition 636 for a state record 624 may be that the mobile computing device has displayed a particular sequence of native applications. In this example, if the contextual data 472 indicates that the mobile computing device displayed the particular sequence of native applications specified in the condition 636, then the condition-based state determiner 646 can select the corresponding state record 624.

Once the processing device 640 selects one or more state records 624, the processing device 640 can generate a state object 670. The state object 670 may include information from the selected state record(s) 624 to generate the state object 670. For example, the state object 670 may include the application ID 422 and/or the state ID 426. Additionally, the state object 670 may include the state access mechanism 428, the preview 429, the icon 430, the caption 432, and/or the image 434. The state object 670 may also include the symbol 492 and/or the formatting style 494. The processing device 640 may generate the state object 670 by instantiating a data container (e.g., a JSON object, XML file, etc.) and then write information from the selected state record(s) 624 to the data container. The processing device 640 may execute computer-readable instructions that correspond with a state object determiner (not shown) and the state object determiner may generate the state object 670. Upon generating the state object 670, the server 600 can transmit the state object 670 to the mobile computing device.

Figure 7:
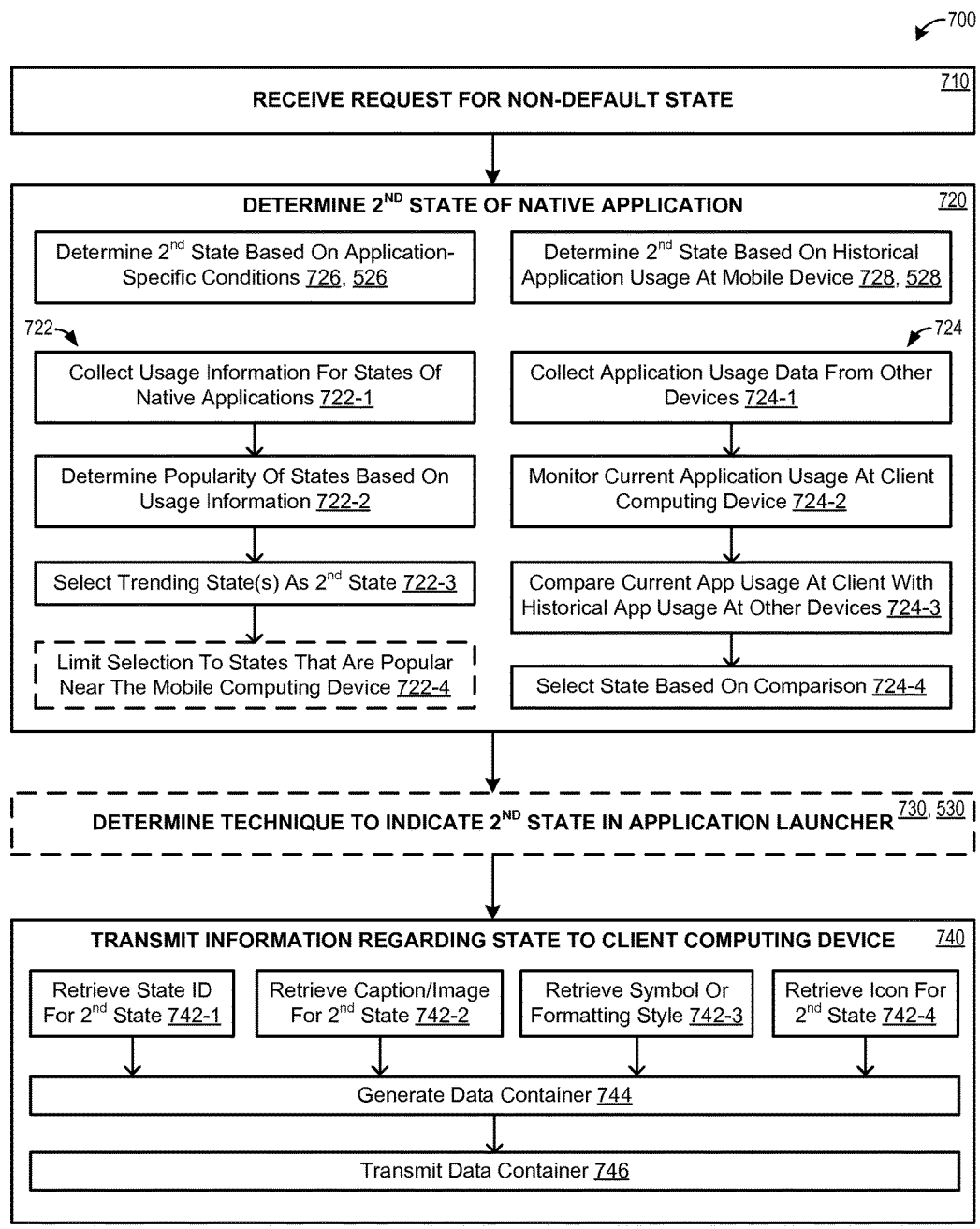
FIG. 7 is a block diagram of an example method the server may execute to determine alternative launch states for native applications installed at the mobile computing device.

FIG. 7 illustrates an example method 700 for identifying a non-default state into which a native application can be launched. The method 700 may be executed by a server (e.g., the server 600 shown in FIG. 6). The method 700 may be implemented as a set of computer-readable instructions that are executed by a processing device (e.g., the processing device 640 shown in FIG. 6). Generally, the server receives a state request from a mobile computing device (e.g., a client computing device) (at 710). The state request requests information regarding a non-default state into which a native application can be launched. The server identifies a non-default state of the native application (at 720). The server may determine a technique for indicating the non-default state (at 730). Lastly, the server transmits information regarding the non-default state to the mobile computing device.

Referring to 710, the server receives a state request from a mobile computing device. The state request requests information regarding a non-default state into which a native application can be launched. The state request may identify the native application by specifying an application ID that identifies the native application. Also, the state request may include application IDs for more than one native application. For example, the state request may include application IDs for all native applications that are installed at the mobile computing device. The state request may also include contextual data that indicates a context of the mobile computing device. For example, the contextual data may include sensor measurements such as a location of the mobile computing device, time of day, etc. The contextual data can indicate which native applications and/or application states were used recently. The state request may also include a search query.

Referring to 720, the server can utilize a variety of techniques to determine a non-default state into which a particular native application can be launched. For example, the server can select a state that is currently trending (at 722). Alternatively or additionally, the server can select a state based on application usage data from other computing devices (at 724). The server can select a state based on historical application usage data of the mobile computing device that sent the state request (at 728). The server can select a state, if a condition associated with the state is satisfied (at 726).

At 722, the server can select a state, if the state is currently trending. At 722-1, the server collects usage information for all states of a native application. The usage information may include the number of times that the state has been accessed within a given time period (e.g., the last 24 hours, the last 7 days, etc.). At 722-2, the server determines a trending score (e.g., a popularity score) for each state based on the usage information. The server can assign a trending score to a state based on the number of times the state is accessed (e.g., viewed) during a given amount of time. For example, a state with the highest number of accesses can be assigned a trending score of 1, while a state with the lowest number of accesses can be assigned a trending score of 0. The server can utilize various other techniques to assign the trending scores. At 722-3, the server selects the trending state based on the trending scores. The server may select the state with the highest trending score. In some implementations, the server defines a geographical area based on the current location of the mobile computing device and identifies the trending state within that particular geographical area (at 722-4). In some examples, the server defines the geographical area, so that the mobile computing device is at the center of a circle with a radius of R miles (e.g., R=5 miles).

At 724, the server can select a state, if the current context of the mobile computing device matches the context of other mobile computing device when the other mobile computing devices accessed the state. At 724-1, the server collects application usage data from other mobile computing devices. Specifically, for each state, the server may store contextual data of other mobile computing devices when the other mobile computing devices accessed that state. For example, the server may store application IDs for native applications that other mobile computing devices displayed prior to accessing a particular state. At 724-2, the server monitors the current application usage at the client computing device. In other words, the server monitors the current application usage at the mobile computing device that sent the state request. Monitoring the current application usage may include identifying the native applications that the mobile computing device displayed within a given period of time (e.g., the last 5 minutes). At 724-3, the server compares the current application usage at the client computing device with the historical application usage at other mobile computing devices. At 724-4, the server selects a state based on the comparison. Specifically, the server selects a state if the historical application usage data stored in association with that state matches the current application usage.

Referring to 726, the server may select a state based on conditions that are associated with the states. At 726, the server may utilize techniques that are similar to the techniques described in relation to the operations indicated by 526 in FIG. 5. Referring to 728, the server may select a state based on the historical application usage at the mobile computing device that is requesting the state. At 728, the server may utilize techniques that are similar to the techniques described in relation to the operations indicated by 528 in FIG. 5.

At 730, the server determines a visual technique that the client computing device can utilize to indicate that the native application can be launched into the non-default state that the server determined at 720. The visual techniques that the server determines may be similar to the visual techniques described in relation to 530 shown in FIG. 5.

At 740, the server transmits information regarding the non-default state to the client computing device. Once the server identifies a non-default state, the server can retrieve information regarding that state from a state record that corresponds with the state. For example, the server can retrieve a state ID that identifies the state (at 742-1). The server can also retrieve an access mechanism that identifies the state and provides access to the state. The server may retrieve a caption and/or an image that corresponds with the state (at 742-2). The server may retrieve a symbol and/or a formatting style that corresponds with the state (at 742-3). The server may retrieve an icon for the state (at 742-4). At 744, the server instantiates a data container (e.g., a JSON object, an XML file or the like) and writes information regarding the state to the data container. The data container may be referred to as a state result object. At 746, the server transmits the data container to the client computing device.

A software application (e.g., native applications 420 in FIG. 4) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

A non-transitory memory (e.g., memory 410 in FIG. 4) may be physical devices used to store programs (e.g., sequences of instructions) or data (e.g., program state information) on a temporary or permanent basis for use by a computing device (e.g., mobile computing device 400). The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a LCD (liquid crystal display) monitor, or touch screen for displaying information to the user and optionally a keyboard and a pointing device, e.g., a mouse, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An electronic device comprising:
   a transceiver;
   a touch_screen;
   sensors;
   a memory that stores at least one application; and
   at least one processor that executes computer-readable instructions that, when executed by the at least one processor, cause the at least one processor to:
      display a first icon corresponding to the at least one application on the touch screen, wherein the first icon comprises a first object related to a first default state of the at least one application;
      receive, via the transceiver, a data object that includes at least one information regarding a second default state of the at least one application which is different from the first default state,
      in response to the receiving of the data object, display a second icon instead of the first icon, wherein the second icon comprises the first object and a second object related to the second default state,
      after the displaying of the second icon, receive a user input for selecting the second icon,
      identify whether the user input corresponds to the first object or the second object,
      when the user input is identified to correspond to the first object, display the first default state, and
      when the user input is identified to correspond to the second object, display the second default state.

2. The electronic device of claim 1, wherein the receiving of the data object comprises receiving the data object in response to:
   retrieving, from the memory, an application identifier (ID) that identifies the at least one application,
   transmitting the application ID, via the transceiver, to a server, and
   receiving the data object from the server.

3. The electronic device of claim 1, wherein the receiving of the data object comprises receiving the data object in response to:
   capturing contextual data that indicates a context of the electronic device, and
   transmitting the contextual data via the transceiver.

4. The electronic device of claim 3, wherein the capturing of the contextual data comprises retrieving sensor measurement values recorded by the sensors.

5. The electronic device of claim 1, wherein the displaying of the second icon comprises:
   reducing a size of the first object, and displaying the second object in an area of the second icon that was previously occupied by the first object.

6. The electronic device of claim 5, wherein the reduced size of the first object and a size of the second object are about equal.

7. The electronic device of claim 1, wherein the displaying of the second icon comprises overlaying the second object onto a portion of the first object.

8. The electronic device of claim 7, wherein the second object is overlaid towards a corner of the first object.

9. An electronic device comprising:
a transceiver;
a touch_screen;
sensors;
a memory that stores at least one application; and
at least one processor that executes computer-readable instructions that, when executed by the at least one processor, cause the at least one processor to:
  display a first icon corresponding to the at least one application on the touch screen, wherein the first icon comprises a first object regarding a first default state of the at least one application,
  retrieve an application identifier (ID) corresponding to the at least one application,
  transmit the application ID via the transceiver,
  receive, in response to the transmitting of the application ID, a data container that includes at least one information regarding a second default state of the at least one application which is different from the first default state,
  in response to the receiving of the data container, display a second icon instead of the first icon, wherein the second icon comprises the first object and second object related to the second default state of the at least one application, and wherein the second default state can be accessed by pressing and holding the second icon,
  display a preview of the second default state upon detecting a press-and-hold of the second icon, and
  launch the at least one application into the second default state upon detecting a press of the preview.

10. The electronic device of claim 9, wherein the displaying of the second icon comprises:
retrieving a symbol from the memory, and
overlaying the symbol onto the first icon.

11. The electronic device of claim 9, wherein the displaying of the indication second icon comprises:
retrieving a formatting style from the memory, and
applying the formatting style to the second icon.

12. The electronic device of claim 9, wherein the displaying of the preview comprises displaying the preview adjacent to the second icon.

13. The electronic device of claim 9,
wherein the second icon comprises the first object and a first caption, and
wherein the displaying of the preview comprises displaying the second object and/or a second caption associated with the second default state of the at least one application.

14. The electronic device of claim 9, wherein the displaying of the preview comprises displaying a portion of the at least one information displayed by the second default state of the at least one application.

15. An electronic device comprising:
a transceiver;
sensors;
a memory that stores a native application installed on the electronic device;
a touch_screen; and
at least one processor that executes computer-readable instructions that, when executed by the at least one processor, cause the at least one processor to:
  display a first icon corresponding to the at least one application via on touch screen, wherein the first icon comprises a first object related to a first default state of the at least one application,
  receive, via the transceiver, a data object that includes at least one information regarding a second default state of the at least one application which is different with the first default state,
  in response to the receiving the data object, display a second icon instead of the first icon, wherein the second icon comprises the first icon and a second object related to the second default state,
  receive a user input for launching the at least one application into the second default state, and
  launch the at least one application into the second default state upon receiving the user input to launch the at least one application into the second default state.

16. The electronic device of claim 15, wherein the at least one processor executes computer-readable instructions that, when executed by the at least one processor, cause the at least one processor to:
retrieve, from the memory, an application identifier (ID) that identifies the at least one application, and
transmit the application ID via the transceiver.

17. The electronic device of claim 15, wherein the at least one processor is further configured to:
capture contextual data that indicates a context of the electronic device,
send the contextual data via the transceiver, and
receive, in response to the transmitting of the contextual data, a data container that includes information regarding the second default state of the at least one application.

18. The electronic device of claim 15, wherein the at least one processor is further configured to:
capture contextual data that indicates a context of the electronic device,
compare the contextual data with rules associated with states of the at least one application, and
select the second default state of the at least one application based on the comparison.

19. The electronic device of claim 15, wherein the at least one processor is further configured to:
monitor current application usage,
compare current application usage with historical application usage, and
select the second default state of the at least one application based on the comparison.

20. The electronic device of claim 15,
wherein the first icon comprises a first caption and the first object, and
wherein the at least one processor is further configured to:
  determine a second caption and/or the second object corresponding to the second default state of the at least one application,
  replace the first caption with the second caption and/or replace the first object with the second object, and
  link the second icon to the second default state by upon detecting a user selection of the second icon.

21. The electronic device of claim 15,
wherein the first icon comprises a first caption and the first object, and
wherein the at least one processor is further configured to:
  determine a second caption and/or the second object related to the second default state of the at least one application,
  display the second icon by overlaying the second default object or the second caption onto the first object, and
  link a portion of the icon to the second default state by detecting a user selection of the second object or the second caption.

22. The electronic device of claim 15,
wherein the first icon comprises the first object, and
wherein the at least one processor is further configured to:
  determine the second object related to the second default state of the at least one application,
  reduce a size of the first object,
  display the second object in an area of the second icon that was previously occupied by the first object, and
  link the second object to the second default state upon detecting a user selection of the second object.

23. The electronic device of claim 15, wherein the at least one processor is further configured to:
  retrieve a symbol from the memory,
  overlay the symbol onto the first icon, and
  configure an application launcher to display a preview of the second default state upon detecting a press-and-hold of the second icon.

24. The electronic device of claim 23, wherein the receiving of the user input for launching the at least one application into the second default state comprises receiving a user selection of the preview.

25. The electronic device of claim 15, wherein the at least one processor is further configured to:
  replace the first icon with a folder icon that corresponds with a folder,
  place the first icon for the first default state and the second icon in the folder, and
  link the second icon to the second default state by configuring an application launcher to launch the at least one application into the second default state upon detecting a press of the second icon.

26. The electronic device of claim 15, wherein the receiving of the user input for launching the at least one application into the second default state comprises detecting a press of the second icon when the second icon is linked to the second default state.

27. The electronic device of claim 15, wherein the receiving of the user input for launching the at least one application into the second default state comprises detecting a press of a portion of the second icon that is linked to the second default state.

28. The electronic device of claim 15, wherein the receiving of the user input for launching the at least one application into the second default state comprises:
  detecting a press-and-hold of the second icons, and
  detecting a press of a preview of the second default state.

29. The electronic device of claim 15, wherein the receiving of the user input for launching the at least one application into the second default state comprises:
  detecting a press of a folder icon corresponding with a folder that includes the first icon for the first default state and the second icon for the second default state, and
  detecting a press of the second icon.

30. The electronic device of claim 15, wherein the launching of the at least one application into the second default state comprises invoking an access mechanism that provides access to the second default state.

31. An electronic device comprising:
  a touch screen;
  sensors;
  a memory that stores at least one application installed on the electronic device; and
  a computing processor that executes computer-readable instructions that, when executed by the computing processor, cause the computing processor to:
    display an icon corresponding to a first application of the at least one application, wherein the icon comprises a first object regarding a first state of the first application and a second object regarding a second state of the first application,
    when the first object is selected according to a touch on the icon, execute the first application and display a first screen associated with the first state, and
    when the second object is selected according to the touch on the icon, execute the first application and display a second screen associated with the second state.

32. The electronic device of the claim 31, wherein the executing of the computer-readable instructions cause the computing processor to:
  identify a change of context information of the electronic device, and
  in response to the identifying of the change of the context information of the electronic device, display another icon corresponding to the first application, wherein the another icon comprises the first object and a third object regarding a third state of the first application different from the second state, and the third state of the first application is associated with the changed context information.

* * * * *